US012621136B2

(12) United States Patent
Farinholt et al.

(10) Patent No.: US 12,621,136 B2
(45) Date of Patent: May 5, 2026

(54) QUANTUM KEY DISTRIBUTION PROTOCOL WITH WEAK MEASUREMENTS

(71) Applicants: Jacob M. Farinholt, Bowie, MD (US); James E. Troupe, Austin, TX (US)

(72) Inventors: Jacob M. Farinholt, Bowie, MD (US); James E. Troupe, Austin, TX (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/844,404

(22) Filed: Apr. 9, 2020

(65) Prior Publication Data

US 2022/0329417 A1 Oct. 13, 2022

Related U.S. Application Data

(60) Provisional application No. 62/831,361, filed on Apr. 9, 2019.

(51) Int. Cl.
*H04L 9/08* (2006.01)

(52) U.S. Cl.
CPC ................................. *H04L 9/0858* (2013.01)

(58) Field of Classification Search
CPC .................................................... H04L 9/0858
See application file for complete search history.

(56) References Cited

U.S. PATENT DOCUMENTS

| | | | |
|---|---|---|---|
| 7,305,091 B1* | 12/2007 | Hirano | H04B 10/70 |
| | | | 380/255 |
| 8,391,486 B2 | 3/2013 | Troupe | |
| 9,306,739 B1* | 4/2016 | Troupe | H04L 9/0858 |

(Continued)

OTHER PUBLICATIONS

Farinholt et al.; "Enhancing QKD security with weak measurements", 2016, Proceedings of SPIE, vol. 9996, pp. 1-10. (Year: 2016).*

(Continued)

*Primary Examiner* — Matthew Smithers
(74) *Attorney, Agent, or Firm* — Gerhard W. Thielman

(57) ABSTRACT

A quantum key distribution (QKD) receiver is provided for communicating with a transmitter that produces a plurality of entangled photon qubit pairs to send one qubit from each pair randomly alternating between basis states. The receiver includes a first polarized beam splitter, an orthogonal pair of photon detectors, a weak measurement apparatus, a broadcaster, an error rate estimator, and a post-processor. The first splitter receives the one qubit for passage or reflection. The photon detector pair measures the one qubit from passage or reflection. The apparatus performs a weak measurement on the one qubit and includes an impedance device to induce time delay, a pair of mirrors flanking the impedance device, and second and third polarized beam splitters for alternatively passing the one qubit to each other and to the pair of mirrors. The broadcaster for sending weak measurement results from the detectors to the transmitter. The error rate estimator determines whether the weak measurement satisfies a bit error threshold. The post-processor corrects the weak measurement from one of the basis states in response to a shared random key from the transmitter.

4 Claims, 8 Drawing Sheets

(56) References Cited

U.S. PATENT DOCUMENTS

| | | | | |
|---|---|---|---|---|
| 2007/0009098 A1* | 1/2007 | Tanaka | | H04L 9/0858 |
| | | | | 380/30 |
| 2007/0016534 A1* | 1/2007 | Harrison | | H04L 9/0858 |
| | | | | 705/65 |
| 2008/0292099 A1* | 11/2008 | Gisin | | H04L 9/0858 |
| | | | | 380/29 |
| 2009/0010435 A1* | 1/2009 | Zbinden | | H04B 10/70 |
| | | | | 380/256 |
| 2012/0314863 A1* | 12/2012 | Troupe | | H04B 10/70 |
| | | | | 380/256 |
| 2013/0016835 A1* | 1/2013 | Zbinden | | H04L 9/0852 |
| | | | | 380/255 |
| 2013/0089206 A1* | 4/2013 | Englund | | H04L 9/0852 |
| | | | | 380/278 |
| 2013/0155411 A1* | 6/2013 | Parks | | G06N 10/00 |
| | | | | 356/450 |
| 2015/0270959 A1* | 9/2015 | Tanizawa | | H04L 9/0858 |
| | | | | 380/30 |
| 2016/0149700 A1* | 5/2016 | Fu | | H04L 9/0858 |
| | | | | 380/278 |
| 2018/0367301 A1* | 12/2018 | Su | | H04L 9/0852 |

OTHER PUBLICATIONS

Botero et al.; "Quantum-communication protocol employing weak measurements", 2000, The American Physical Society, vol. 61, pp. 1-4. (Year: 2000).*

Huber et al.; "Weak randomness in device-independent quantum key distribution and the advantage of using high-dimensional entanglement", 2013, The American Physical Society, vol. 88, pp. 1-7. (Year: 2013).*

Bouda et al.; "Weak randomness seriously limits the security of quantum key distribution", 2012, The American Physical Society, vol. 86, pp. 1-5. (Year: 2012).*

A. R. Dixon et al. "Gigahertz decoy quantum key distribution . . . " Optics Express 16 (23) 2008. https://www.osapublishing.org/DirectPDFAccess/DC09E51B-0E37-BF2F-2A81E3E350BB3094_173135/oe-16-23-18790.pdf.

I. Gerhardt et al. "Experimentally faking the violation of Bell's inequalities" Phys Rev Lett 107:170404, 2011. https://journals.aps.org/prl/pdf/10.1103/PhysRevLett.107.170404.

C. Gobby et al. "Quantum key distribution over 122 km of standard opticai fiber" Appl Phys Lett 84:3762, 2004. https://arxiv.org/ftp/quant-ph/papers/0412/0412171.pdf (preprint).

P. Gonzáles "Quantum key distribution with untrusted detectors" Phys Rev A 92: 022337 2015. https://arxiv.org/pdf/1410.1422.pdf (preprint).

D. Gottesman et al. "Security of quantum key distribution with imperfect devices" Quantum Info & Comp 4 (5) 2004. http://www.theory.caltech.edu/~preskill/pubs/preskill-2004-imperfect.pdf.

N. Jain et al. "Trojan-horse attacks threaten the security of practical quantum cryptography" New J of Phys 16:123030 2014. https://iopscience.iop.org/article/10.1088/1367-2630/16/12/123030/pdf.

A. Lamis-Linares et al. "Breaking a quantum key distribution system . . . " Optics Express 15:9388, 2007. https://arxiv.org/pdf/0704.3297.pdf (preprint).

H.-K. Lo et al. "Unconditional security of quantum key distribution . . . " Sci 283(5410) 2050-56, 1999. https://science.sciencemag.org/content/sci/283/5410/2050.full.pdf.

H.-K. Lo et al. "Decoy state quantum key distributions" Phys Rev Lett 94:230504, 2005. https://journals.aps.org/prl/pdf/10.1103/PhysRevLett.94.230504.

H.-K. Lo et al. "Measurement-device-independent quantum key distribution" Phys Rev Lett 108:130503, 2012. https://journals.aps.org/prl/pdf/10.1103/PhysRevLett.108.130503.

S. J. Weber et al. "Mapping the optimal route between two quantum states" Nature 511: 570-73, 2014. https://www.nature.com/articles/nature13559.pdf.

H. M. Wiseman "Weak values, quantum trajectories and the cavity-QED experiment . . . " Phys Rev A 65:032111, 2002. https://journals.aps.org/pra/pdf/10.1103/PhysRevA.65.032111.

F. Xu et al. "Practical aspects of measurement-device-independent quantum key distribution" New J of Phys 15:113007, 2013. https://iopscience.iop.org/article/10.1088/1367-2630/15/11/113007/pdf.

F. Xu et al. "Discrete-variable measurement-device-independent quantum key distribution . . . " Nature Photonics Correspondence, 2015. https://arxiv.org/pdf/1506.04819.pdf.

I. V. Volovich "Seven Principles of Quantum Mechanics" 2002. https://eds.cem.ch/record/598319/files/0212126.pdf.

A. Boaron et al. "Detector-device-independent QKD . . . " 2016. https://www.osti.gov/pages/servlets/parl/1295342.

Y. Aharonov et al. "How the Result of a Measurement . . . can turn out to be 100" Phys Rev Lett 60(14) 1988.

Y. Aharonov et al. "Properties of a quantum system . . . " Phys Rev A 41(1) 1990. https://journals.aps.org/pra/pdf/10.1103/PhysRevA.41.11.

J. Barrett et al. "No Signaling and Quantum Key Distribution" Phys Rev Lett 95(1) 010503, 2005. https://cqi.inf.usi.ch/qic/05_Barrett_Hardy_Kent-No_Signaling_and_Quantum_Key_Distribution.pdf.

J. Barrett et al. "Memory Attacks . . . " Phys Rev. Lett 110:010503, 2013. https://arxiv.org/pdf/1201.4407.pdf (preprint).

V. P. Belavkin et al. "Nondemolition observation of a free quantum particle" Phys Rev A 45(3) 1992. https://journals.aps.org/pra/pdf/10.1103/PhysRevA.45.1347.

C. H. Bennett et al. "Quantum cryptography" Theor Comp Sci 560, 2014. https://core.ac.uk/download/pdf/82447194.pdf.

G. Brassard et al. "Limitations on Practical Quantum Cryptography" Phys Rev Lett 85(6), 2000. https://journals.aps.org/prl/pdf/10.1103/PhysRevl.ett.85.1330.

H. J. Carmichael et al. "Quantum interference and collapse of the wavefunction in cavity QED" Opt Comm 82(1, 2), 1991.

L. C. Commander et al. "Gigahertz-gated InGaAs/InP single photon detector . . . " J Appl Phys 117. 083109, 2015. https://aip.scitation.org/doi/pdf/10.1063/1.4913527?class=pdf.

L. Cortez et al. "Rapid estimation of drifting parameters in continuously measured quantum system" Phys Rev A 95: 012314, 2017. https://journals.aps.org/pra/pdf/10.1103/PhysRevA.95.012314.

M. Curty et al. "Finite-key analysis for Measurement-device-independent quantum key distribution" Nature Comm 5:3732, 2014. https://arxiv.org/pdf/1307.1081.pdf (preprint).

L. Lydersen et al. "Hacking commercial quantum cryptography systems . . . " Nature Photonics 4: 686-89, 2010. https://arxiv.org/pdf/1008.4593.pdf (preprint).

X. F. Ma et al. "Practical decoy state for quantum key distribution" Phys Rev A 72:012326, 2005. https://journals.aps.org/pra/pdf/10.1103/PhysRevA.72.012326.

V. Makarov et al. "Creation of backdoors in quantum communications via laser damage" Phys Rev Lett 94:030302(R), 2016. https://journals.aps.org/pra/pdf/10.1103/PhysRevA.94.030302.

S. Sajeed et al. "Insecurity of detector-device-independent quantum key distribution" Phys Rev Lett 117:250505 2016. https://journals.aps.org/prl/pdf/10.1103/PhysRevLett.117.250505.

P. W. Shor et al. "Simple proof of security of the BB84 quantum key distribution protocol" Phys Rev Lett 85:2000. https://journals.aps.org/prl/pdf/10.1103/PlayRevLett.85.441.

N. Sinclair et al. "Proposal and . . . demonstration of non-destructive detection of photonic qubits . . . " Nature Comm 7:13454, 2016. https://www.research.net/publications/310764471_Proposal_and_proof-of-principle_demonstration_of_non-destructive_detection_of_photonic_qubits_using_a_TmLiNb)3_waveguide.

Y.-L. Tang et al. "Measurement device-independent quantum key distribution . . . " Phys Rev Lett 113:190501, 2014. https://journals.aps.org/prl/pdf/10.1103/PhysRevLett.113.19051.

J. E. Troupe et al. "Quantum Cryptography with Weak Measurements" 2017. https://arxiv.org/pdf/1702.04836.pdf.

R. Valivarthi et al. "Measurement-device-independent quantum key distribution" J of Modern Optics 62:1141-50, 2015. https://arxiv.org/pdf/1501.07307.pdf (preprint).

X.-B. Wang "Beating the photon-number-splitting attack . . . " Phys Rev Lett 94:230503, 2014. https://journals.aps.org/prl/pdf/10.1103/PhysRevLett.94.230503.

(56) References Cited

OTHER PUBLICATIONS

J. Bouda et al. "Weak randomness seriousy limits the security of quantum key distribution" *Phys Rev A* 86:, 2012. https://journals.aps.org/pra/pdf/10.1103/PhysRevA.86.062308.

J. M. Farinholt et al. "Enhancing QKD Security with Weak Measurements" *Proc SPIE* 9996: 2016. https://www.spiedigitallibrary.org/conference-proceedings-of-spie/9996/99960B/Enhancing-QKD-security-with-weak-measurements/10.1117/12.2241059.full?SSO=1.

J. M. Farinholt et al.: "Enhancing QKD security with weak measurements" https://www.spiedigitallibrary.org/conference-proceedings-of-spie/9996/1/Enhancing-QKD-security-with-weak-measurements/10.1117/12.2241059.full?SSO=1.

A. N. Jordan et al.: "Heisenberg scaling with weak measurement" *Quan. Stud. Math Found.* (2015) https://qcamp.ece.ucr.edu/publications/pdf/QuantumStud.2.5.pdf.

B. R. La Cour et al.: "Classical Simulated Annealing using Quantum Analogs" *J. Stat. Phys.* 164 772-784 (2016) https://link.springer.com/content/pdf/10.1007/s10955-016-1570-4.pdf.

A. Lamas-Linares et al.: "Secure quantum clock synchronization" (2018) https://www.spiedigitallibrary.org/conference-proceedings-of-spie/10547/105470L/Secure-quantum-clock-synchronization/10.1117/12.2290561.full?SSO=1.

J. E. Troupe et al.: "A Contextuality Based QKD Protocol" (2015) https://arxiv.org/pdf/1512.02256.pdf.

M. Tomamichel et al.: "A largely self-contained and complete security proof for quantum key distribution" (2017) https://arxiv.org/pdf/1506.08458.pdf preprint.

* cited by examiner

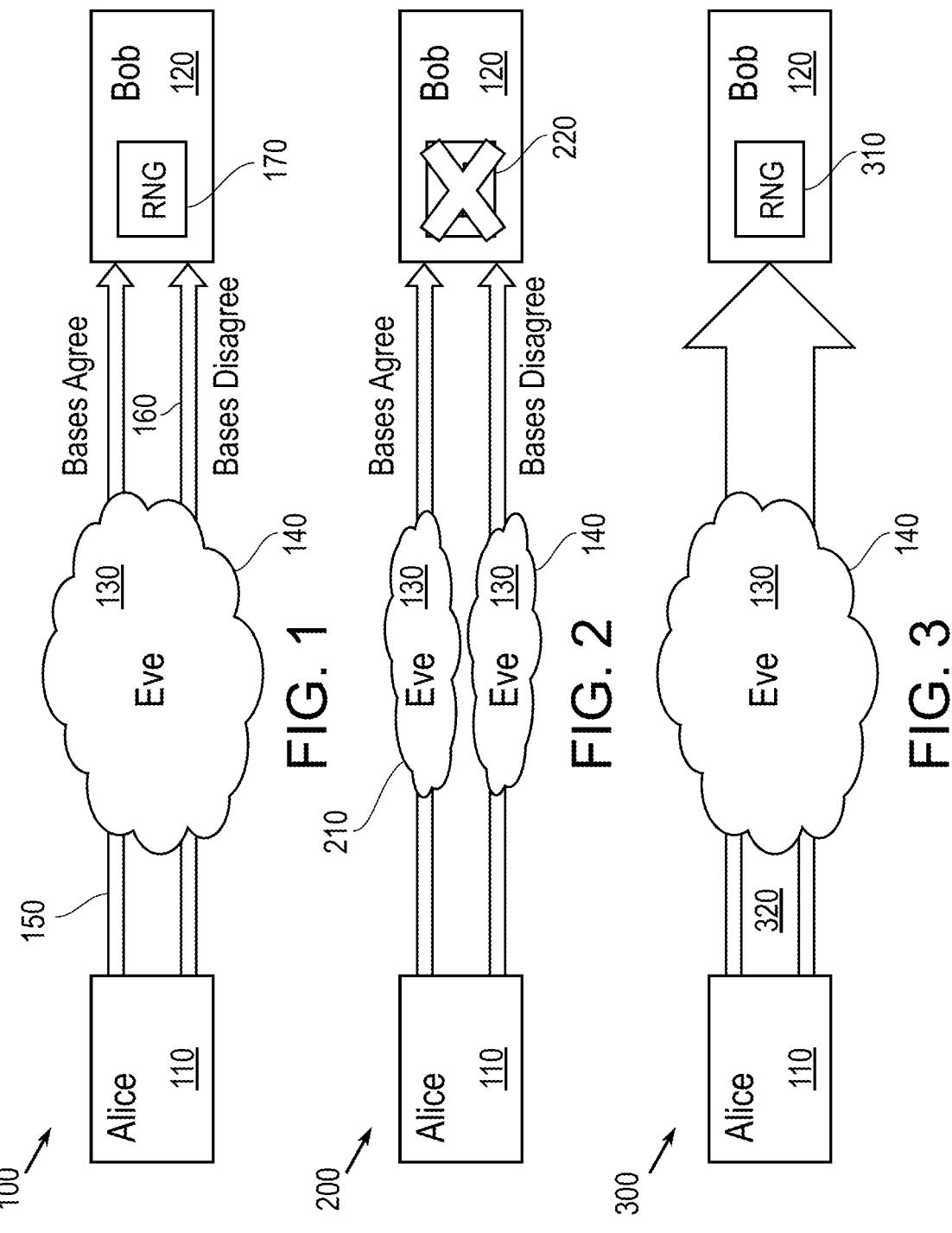

400

| | A WEAK MEASUREMENT QKD PROTOCOL | |
|---|---|---|
| 1 | Alice generates a length $2n$ random string of bits $z \in \{0,1\}^{(2n)}$, encoding each bit in either the $X$ or $Z$ basis uniformly at random. Then she transmits each qubit to Bob. | <u>410</u> |
| 2 | Bob performs weak measurements of $\hat{H}^{+}$ or $\hat{H}^{-}$ chosen uniformly at random on each signal he receives, then he strongly measures in the $Z$ basis, recording both of his measurement results. | <u>420</u> |
| 3 | Bob openly shares the weak measurement results with Alice, who uses them to estimate the bit and phase error rates. If the error rates are too high, she aborts the protocol. | <u>430</u> |
| 4 | If the error rates are low enough, Alice announces which signals were prepared in the $Z$ basis. Alice and Bob perform classical post-processing on these signals to correct the errors and distill a smaller, length $k$ secure key. | <u>440</u> |

Table 1: Outline of a QKD protocol with weak measurements.

FIG. 4

QUANTUM KEY DISTRIBUTION PROTOCOL WITH WEAK MEASUREMENTS

CROSS REFERENCE TO RELATED APPLICATION

Pursuant to 35 U.S.C. § 119, the benefit of priority from provisional application 62/731,361, with a filing date of Apr. 9, 2019, is claimed for this nonprovisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to Quantum Key Distribution (QKD) Protocol. In particular, the invention employs weak measurements to provide the QKD Protocol.

Communication by signal exchange can be remotely conducted between two parties, Alice and Bob. The signals can constitute a string of characters from an established set to transmit a message from Alice to Bob, for example, or vice versa. Eve, an eavesdropper, seeks to intercept the message with the assistance of her agent Fred to possibly benefit an adversary Charlie, while Alice and Bob prefer to secure their confidences that maintain the privacy of their message.

SUMMARY

Conventional quantum key distribution (QKD) communication devices yield disadvantages addressed by various exemplary embodiments of the present invention. In particular, various exemplary embodiments provide a QKD receiver for communicating with a transmitter that produces a plurality of entangled photon qubit pairs to send one qubit from each pair randomly alternating between basis states. The receiver includes a first polarized beam splitter, an orthogonal pair of photon detectors, a weak measurement apparatus, a broadcaster, an error rate estimator, and a post-processor. The first splitter receives the one qubit for passage or reflection. The photon detector pair measures the one qubit from passage or reflection. The apparatus performs a weak measurement on the one qubit and includes an impedance device to induce time delay, a pair of mirrors flanking the impedance device, and second and third polarized beam splitters for alternatively passing the one qubit to each other and to the pair of mirrors. The broadcaster for sending weak measurement results from the detectors to the transmitter. The error rate estimator determines whether the weak measurement satisfies a bit error threshold. The post-processor corrects the weak measurement from one of the basis states in response to a shared random key from the transmitter.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a diagram view of a basis communication channel;

FIG. 2 is a diagram view of an interrupted communication channel;

FIG. 3 is a diagram view of weak measurement communication channel;

FIG. 4 is a tabular view of a weak measurement procedure;

DETAILED DESCRIPTION

Figure 5:
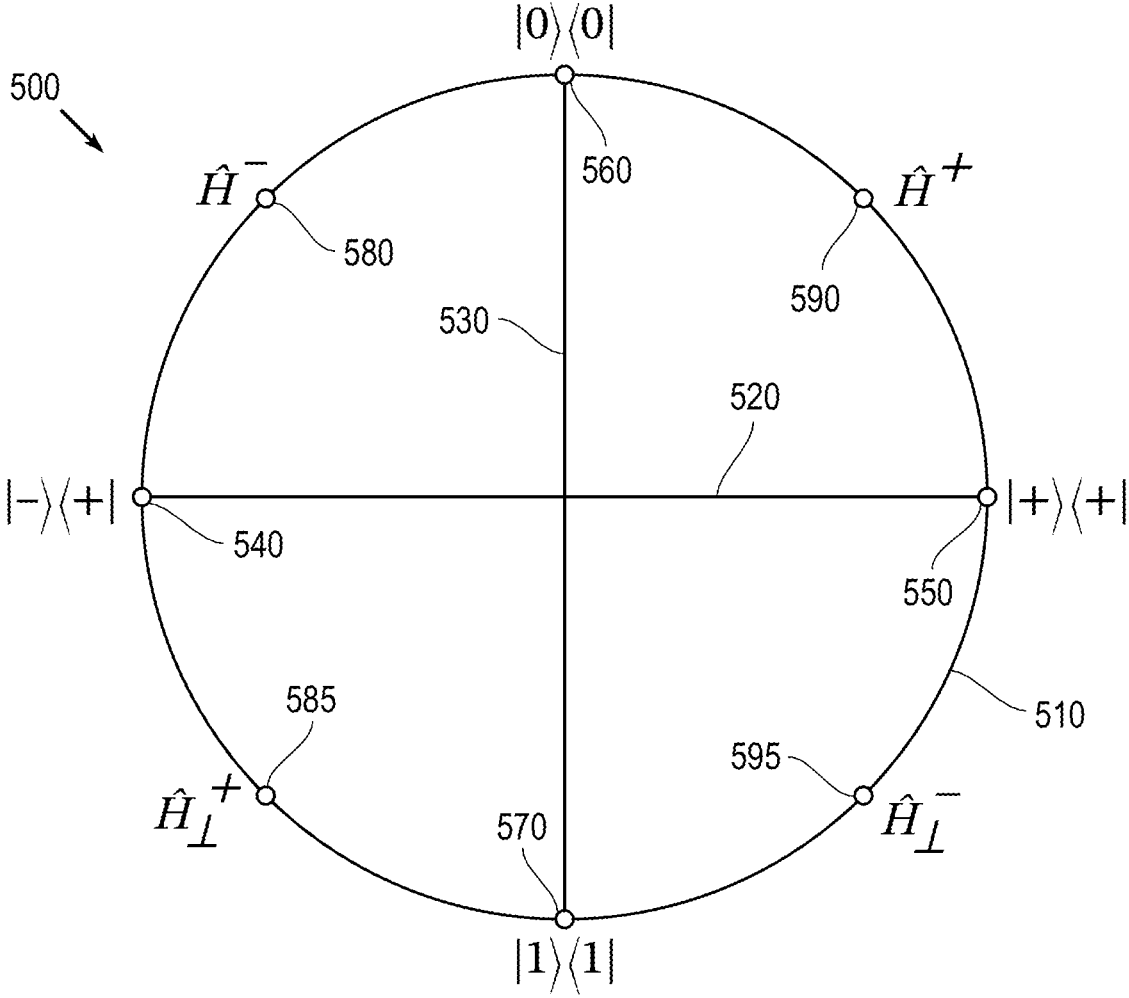
FIG. 5 is a graphical view of a set of observables.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component. The disclosure generally employs quantity units with the following abbreviations: distance (length) in kilometers (km) and time in seconds (s). Supplemental measures can be derived from these.

This disclosure presents exemplary prepare and measure quantum key distribution protocols that decouple the necessary quantum channel error estimation from its dependency on sifting, or otherwise post-selecting, the detection outcomes. Rather than estimating Eve's coupling to the quantum channel from the statistics of the sifted key, this information is inferred from weak measurements made equally on all of the received photons immediately prior to post-selection by the photon detectors. This disclosure demonstrates that the accuracy of the weak measurement parameter estimation is robust to reasonable device imperfections, even in an adversarial environment, and hence the asymptotic security of this protocol can be inferred from the security analysis of BB84.

FIG. 1 shows a diagram view 100 of an assumption under BB84. Alice 110 intends to communicate with Bob 120 while Eve 130 intercepts messages through the network cloud 140. Alice 110 transmits across two channels 140 and 150 with bases respectively agreeing and disagreeing. Bob 120 employs a random number generator (RNG) 170 to encrypt the message. FIG. 2 shows a diagram view 200 of a realistic scenario for Alice 110 and Bob 120. The first channel 140 transmits Alice's signal through a noiseless cloud 210, while the second channel 150 features interference from Eve 130 through the cloud 140, with resulting bases disagreeing. Eve 130 can correlate her measurements with those of Bob 120, thereby violating the assumption from view 100. Eve 130 can assure that her interactions when the bases agree introduce no noise. This causes the RNG 170 to violate 220 the assumption. FIG. 3 shows a diagram view 300 of an exemplary process to include weak measurement (WM) 310. Alice 110 transmits her message as a quantum channel 320 through the cloud 140 with Eve 130 being present, while Bob 120 employing WM 310 estimates parameters with information from each signal, irrespective of basis agreement. This eliminates all measurement basis-dependent attacks, and Bob 120 no longer needs to randomize measurement basis.

In addition to eliminating detector basis-dependent attacks, such as detector blinding, this disclosure demonstrates that this new prepared and measure QKD protocol is immune to a very powerful class of measurement-side device attacks that also enable an adversary control of the weak measurement outcomes given two modest requirements placed on the measurement-side devices. Finally, this disclosure compares the asymptotically achievable secure key rate of a decoy state version of the weak measurement protocol shown to be essentially equal to that of BB84 with decoy states and significantly higher than MDI-QKD for realistic system parameters.

The following references are cited herein in alphabetical order (with arXiv links identifying preprints):

Aharonov (1988). "How the Result of a Measurement . . . can turn out to be 100" *Phys Rev Lett* 60(14), 1351-54

Aharonov (1990). "Properties of a quantum system . . . " *Phys Rev A* 41(1), 11-20 https://journals.aps.org/pra/pdf/10.103/PhysRevA.41.11

Barrett (2005). "No Signaling and Quantum Key Distribution" *Phys Rev Lett* 95(1) 010503, 1-4 https://cgi.inf.usi.ch/qic/05_Barrett_Hardy_Kent-No_Signaling_and_Quantum_Key_Distribution.pdf Barrett (2013). "Memory Attacks on device-independent quantum cryptography" *Phys Rev Lett* 110:010503 https://arxiv.org/pdf/1201.4407.pdf Belavkin (1992). "Nondemolition observation of a free quantum particle" *Phys Rev A* 45(3), 1347-56 https://journals.aps.org/pra/pdf/10.1103/PhysRevA.45.1347

Bennett (1984). "Quantum cryptography" *IEEE Conference—Theor Comp Sci* 560, 7-11 (2014) https://core.ac.uk/download/pdf/82447194.pdf and *Proc. IEEE Int'l Conf on Computers, Systems & Signal Processing* 175-79 https://researcher.watson.ibm.com/researcher/files/us-bennetc/BB84highest.pdf Brassard (2000). "Limitations on Practical Quantum Cryptography" *Phys Rev Lett* 85(6), 1330-33 https://journals.aps.org/prl/pdf/10.1103/PhysRevLett.85.1330

Carmichael (1991). "Quantum interference and collapse of the wavefunction in cavity QED" *Optics Comm* 82(1, 2), 73-79

Comandar (2015). "Gigahertz-gated InGaAs/InP single photon detector with detection efficiency exceeding 55% at 1550 nm" *J Appl Phys* 117:083109, 1-5 https://aip.scitation.org/doi/pdf/10.1063/1.4913527?class=pdf Cortez (2017). "Rapid estimation of drifting parameters in continuously measured quantum systems" *Phys Rev A* 96:012314, 1-11 https://journals.aps.org/pra/pdf/10.1103/PhysRevA.95.012314

Curty (2014). "Finite-key analysis for measurement-device-independent quantum key distribution" *Nature Comm* 5:3732 https://arxiv.org/pdf/1307.1081.pdf Dixon (2008). "Gigahertz decoy quantum key distribution . . . " *Opt Expr* 16(23), 18790-97. https://www.osapublishing.org/DirectPDFAccess/DC09E51B-0E37-BF2F2A81E3E350BB3094_173135/oe-16-23-18790.pdf Gerhardt (2011). "Experimentally faking the violation of Bell's inequalities" *Phys Rev Lett* 107:170404 https://journals.aps.org/prl/pdf/10.1103/PhysRevLett.107.170404

Gobby (2004). "Quantum key distribution over 122 km of standard optical fiber" *Appl Phys Lett* 84:3762 https://arxiv.org/ftp/quant-ph/papers/0412/0412171.pdf Gonzáz (2015). "Quantum key distribution with untrusted detectors" *Phys Rev A* 92: 022337 https://arxiv.org/pdf/1410.1422.pdf Gottesman (2004). "Security of quantum key distribution with imperfect devices" *Quantum Infor and Comp* 4(5), 325-60 http://www.theory.caltech.edu/~preskill/pubs/preskill-2004-imperfect.pdf Jain (2014). "Trojan-horse attacks threaten the security of practical quantum cryptography" *New J of Phys* 16:123030 https://iopscience.iop.org/article/10.1088/1367-2630/16/12/123030/pdf Lamas-Linares (2007). "Breaking a quantum key distribution system through a timing side channel" *Opt Expr* 15, 9388-93 https://arxiv.org/pdf/0704.3297.pdf Lo (1999). "Unconditional security of quantum key distribution over arbitrarily long distances" *Science* 283(5410), 2050-56 https://science.sciencemag.org/content/sci/283/5410/2050.full.pdf Lo (2005). "Decoy state quantum key distribution" *Phys Rev Lett* 94:230504 https://journals.aps.org/prl/pdf/10.1103/PhysRevLett.94.230504

Lo (2012). "Measurement-device-independent quantum key distribution" *Phys Rev Lett* 108:130503 https://journals.aps.org/prl/pdf/10.1103/PhysRevLett.108.130503

Lydersen (2010). "Hacking commercial quantum cryptography systems by tailored bright illumination" *Nature Photonics* 4, 686-89 https://arxiv.org/pdf/1008.4593.pdf Ma (2005). "Practical decoy state for quantum key distribution" *Phys Rev A* 72:012326 https://journals.aps.org/pra/pdf/10.1103/PhysRevA.72.012326

Mailloux (2015). "Quantum key distribution: examination of the decoy state protocol" *IEEE Comm Mag* 53(10), 24-31

Makarov (2016). "Creation of backdoors in quantum communications via laser damage" *Phys Rev A* 94: 030302(R) https://journals.aps.org/pra/pdf/10.1103/PhysRevA.94.030302

Marsili 2013. "Detecting single infrared photons . . . " *Nature Photonics* 7:210-14 https://arxiv.org/ftp/arxiv/papers/1209/1209.5774.pdf Mendelson (2019). "Quantum-Assisted Clustering Algorithms for NISQ-Era Devices" https://arxiv.org/pdf/1904.08992.pdf Sajeed (2016). "Insecurity of detector-device-independent quantum key distribution" *Phys Rev Lett* 117:250505 https://journals.aps.org/prl/pdf/10.1103/PhysRevLett.117.250505

Shor (2000). "Simple proof of security of the BB84 quantum key distribution protocol" *Phys Rev Lett* 85, 441-44 https://journals.aps.org/prl/pdf/10.1103/PhysRevLett.85.441

Silva (2015). "Multiple observers can share the nonlocality of half of an entangled pair by using optimal weak measurements" *Phys Rev Lett* 114:250401 https://journals.aps.org/prl/pdf/10.1103/PhysRevLett.114.250401

Sinclair (2016). "Proposal and . . . demonstration of non-destructive detection of photonic qubits using a Tm:LiNbO3 waveguide" *Nature Comm* 7:13454 https://www.researchgate.net/publication/310764471_Proposal_and_proof-of-principle_demonstration_of_non-destructive_detection_of_photonic_qubits_using_a_TmLiNbO3_waveguide Tang (2014). "Measurement device-independent quantum key distribution . . . " *Phys Rev Lett* 113:190501 https://journals.aps.org/prl/pdf/10.1103/PhysRevLett.113.190501

Troup (2017). "Quantum Cryptography with Weak Measurements" https://www.groundai.com/project/quantum-cryplography-with-weak-measurements/ https://arxiv.org/pdf/1702.04836.1.pdf (preprint)—incorporated by reference.

Valivarthi (2015). "Measurement-device-independent quantum key distribution . . . " *J of Modern Optics* 62:1141-50. https://arxiv.org/pdf/1501.07307.pdf (preprint)

Venkataraman (2012). "Phase modulation at the few-photon level for weak-nonlinearity-based quantum computing" *Nature Photonics* 7:138-41

Wang (2005). "Beating the photon-number-splitting attack . . . " *Phys Rev Lett* 94:230503 https://journals.aps.org/prl/pdf/10.1103/PhysRevLett.94.230503

Weber (2014). "Mapping the optimal route between two quantum states" *Nature* 511, 570-73. https://www.nature.com/articles/nature13559.pdf Wiseman (2002). "Weak values, quantum trajectories, and the cavity-QED experiment . . . " *Phys Rev A* 65:032111 https://journals.aps.org/pra/pdf/10.1103/PhysRevA.65.032111

Xu (2013). "Practical aspects of measurement-device-independent key distribution" *New J of Physics* 15:113007 https://iopscience.iop.org/article/10.1088/1367-2630/15/1/113007/pdf Xu (2015). "Discrete and continuous variables for measurement-device-independent quantum cryptography" *Nature Photonics Correspondence* https://arxiv.org/pdf/1506.04819.pdf Section I Quantum Key Distribution (QKD) Introduction: In the asymptotic security analysis of QKD protocols, one prevailing assumption is that the bit error rates can be ascertained to arbitrary precision through standard post-selection measurements and classical communication. For example, Gottesman (2004) found the accuracy of the bit error rate was taken for granted, whereas bounds were calculated for the variance of the phase error rate from the bit error rate due to device imperfections.

To estimate the error rates of the quantum channel for prepare and measure QKD protocols, Alice 110 and Bob 230 sift the detection outcomes by discarding the cases where Bob's measurement basis is different from Alice's preparation basis. The procedure then uses a randomly chosen subset of the sifted key to estimate the channel error rate. This procedure implicitly assumes that the signals that contributed to the sifted key are statistically representative of all of the signals transmitted through the quantum channel 320. However, there exist strongly basis dependent attacks that can exploit the behavior of the detectors to invalidate this assumption of fair sampling from the quantum channel, e.g., detector blinding attacks.

Detector blinding attacks have been successfully demonstrated on both prepare- and measure and entanglement based QKD protocols utilizing detector behavior as noted by Gerhardt (2011), Lydersen (2010), Makarov (2016) and Sajeed (2016). Another type of detector based attack is one that exploits individual characteristics of the detectors, e.g., timing response from Lamas-Linares (2007), that can cause side-channels that leak information about the detection outcomes. This type of side-channel is important to characterize and limit in any QKD system. However side-channels are generally regarded as less dangerous than detector attacks that use active control of the detectors to target the detection basis. This is because, for almost all protocols, the latter type of attack can completely eliminate the ability to detect eavesdropping.

In an effort to eliminate all detector side-channel attacks, so-called Measurement-Device-Independent (MDI) protocols by Curty (2014), Lo (2012), Tang (2014), Valivarthi (2015) and Xu (2013) were developed that replace Bob's detectors with an additional source, and insert a Bell measurement half-way between Alice 110 and Bob 120. (The Bell measurement relates to the inequality relation developed by John Bell.) In so doing, these protocols replace the dependence of the security on Alice's source and Bob's detectors with its dependence on both Alice and Bob's sources. In addition to MDI-QKD, a recent proposal known as Detector-Device-Independent QKD (DDI-QKD) attempted to close the detector side-channel weakness of prepare and measure protocols by employing a randomized linear optical network between the quantum channel 320 and the receiver's detectors, as with Gonzáz (2015). Unfortunately, DDI-QKD has very recently been shown to in fact be vulnerable to detector blinding attacks by Sajeed (2016), leaving MDI-QKD as currently the most feasible option for eliminating all detector side-channel attacks, with detector blinding arguably being the most serious of these.

This disclosure introduces exemplary methods to utilize single qubit preparation and measurement to perform secure quantum key distribution that explicitly removes the dependency of channel estimation on the detected bit values. Exemplary embodiments estimate the phase and bit errors of the channel by the use of weak measurements of particular observables performed immediately preceding Bob's final post-selections. This approach decouples the error analysis from Bob's detection outcomes, and therefore removes the assumption of fair sampling implicit in all other prepare and measure QKD protocols by using the weak measurement results from all received signals equally to perform security parameter estimation.

While the exemplary protocol isn't measurement-device-independent, the disclosure nevertheless demonstrates that as long as reasonable bounds can be imposed on the leakage of information from the weak measurement device, and one can preclude that Eve's ability to manipulate the signal between the weak measurement and the final detection, then obtaining a secure key remains possible even if Eve 130 completely controls the weak measurement results under a very strong class of measurement-device based attacks. Because the difference between the weak measurement protocol and conventional single qubit QKD protocols is the method of error estimation, the weak measurement protocol does not remove the potential for side-channels that leak sifted key via differences in detector timing. Additionally, as is true for even fully "Device-Independent" QKD protocols from Barrett (2005), the new weak measurement protocol does not prevent memory attacks that use compromised components to record and leak generated key from Barrett (2013).

The remainder of the disclosure is arranged as follows. Section II provides the necessary background material on weak measurements. Section III summarizes the general framework of a QKD protocol using weak measurements. Section IV sketches an entanglement distillation version of the protocol in order to rigorously connect the security of the protocol to the accuracy of the error parameter estimation, followed by a method to ascertain the error parameters from the expectation values determined by the weak measurement results. Section V demonstrates the negligible effect these weak measurements have on the key rate. In Section VI, a full (asymptotic) security analysis of the protocol is performed in the presence of several device imperfections and calculate the effect of these imperfections on key rates. In Section VII, the most adversarial case is considered in which the weak measurements take place inside a black box in the possession of Eve and operated internally by Fred, an agent of Eve. One can assume that Fred has limited ability to communicate with Eve; however, Eve has unlimited ability to communicate with Fred. One conjectures an optimal attack strategy for Eve in this scenario, and verify the protocol is secure against this attack even when Eve's interaction with the quantum channel is strongly basis dependent and Eve has complete control of the weak measurement results themselves. In Section VIII, the disclosure briefly describes possible implementations of the required weak measurements. Finally in Section IX, the asymptotically achievable secure key rates of the new weak measurement protocol are compared to that of BB84 from Bennett (1984) and Lo (2005), as well as MDI-QKD from Lo (2012) for realistic system parameters.

Section II Background on Weak Measurements: The concept of weak measurements has a long and interesting history with its origins in the investigation of the foundations of quantum measurement. There are two main approaches to weak measurements roughly divided by their intended use: continuous and discrete (or quasi-instantaneous) weak measurements. Continuous weak measurements developed from the theory of open quantum systems in Belavkin (1992), Carmichael (1991) and Wiseman (2002), and find great utility today in methods for feedback and adaptive control of quantum systems, particularly for quantum information processing in Cortez (2017) and Weber (2014). The term "discrete" weak measurement was introduced by Aharonov (1988) and Aharonov (1990) as a method of providing experimental access to weak values, the values of observables of a quantum system at an intermediate time between pre-selection and post-selection by initial and final quantum states. While the disclosure doesn't explicitly use any of the properties of weak values themselves, the QKD protocol presented was inspired by them. Accordingly, this disclosure uses the discrete interaction version of weak measurements throughout.

The basic idea of a weak measurement is for the measuring system to itself be treated as quantum mechanical. This measurement device (MD) has a quantum state as a well-defined superposition of initial positions (and accordingly relatively certain momentum). One can engineer a weak interaction between the MD and the target quantum system over a brief time interval. As a result, the MD's position wave function is evolved by a small translation proportional to the weak value of the pre- and post-selected target system. In addition, because the interaction is weak, the MD and target system are only very weakly entangled so that upon a projective measurement of the MD's position, the target system is only very rarely projected into an orthogonal state. Unlike the standard strong measurement of a quantum mechanical observable that disturbs the measured system and "collapses" its state into an eigenstate of the observable, a weak measurement does not appreciably disturb the quantum system. This is possible because very little information about the observable is extracted in a single weak measurement. The target system need not be post-selected when performing weak measurements. In that case, instead of registering a translation proportional to the real component of the weak value, the average translation will be an amount proportional to the expectation value of the observable given the target system's initial state. This means that one can use weak measurements of a large set of identically prepared quantum systems to estimate the expectation value of an observable without significantly disturbing the individual systems' quantum states.

More formally, weak measurements can be described using the von Neumann model of quantum measurement as per John von Neuman in 1955. Consider an observable $\hat{A}$ pertaining to a quantum system pre-selected to be in the state $|\psi_m\rangle$. The Hamiltonian observable that describes the interaction between the system and measuring device (MD) is:

$$\hat{H}_{int}=g(t)\hat{P}_{MD}\otimes\hat{A}, \tag{1}$$

where $\hat{P}_{MD}$ is the momentum operator for the measuring device and $\otimes$ is the tensor product operator. The evolution operator $\hat{U}_{wm}$ for the system and measuring device is then given by:

$$\hat{U}_{wm}=\exp\left(-i\int_{t_0-\varepsilon}^{t_0+\varepsilon}\hat{H}(t)dt\right)=\exp(-ig\hat{P}_{MD}\otimes\hat{A}), \tag{2}$$

where one can set Planck's constant to unity as h=1, and the interaction is only non-zero from $t_0-\varepsilon$ to $t_0+\varepsilon$. The measurement interaction is weakened by minimizing $g/\sigma_{MD}$, where $g=\int_{t_0-\varepsilon}^{t_0+\varepsilon}g(t)dt$ is a constant defining the coupling strength, and $\sigma_{MD}$ is the uncertainty in the position observable for the measuring device.

The measurement device (MD) can be imagined to have an initial quantum state that is a real-valued Gaussian with unit uncertainty. Then, in the limit of very weak coupling between the measuring device and the system, the weak measurement of the observable $\hat{A}$ results in a shift in the MD's wavefunction so that:

$$\varphi(x)\to\varphi(x-gRe[A_w]), \tag{3}$$

where g is the interaction coupling strength and $A_w$ is the weak value of the observable being measured. The weak value of an observable $\hat{A}$ conditioned on the pre-selected state $\rho_i$ and post-selected (pure) state $|\varphi\rangle\langle\varphi|$ is given by:

$$\varphi A_w^{\rho_i} = \frac{Tr\lfloor |\varphi\rangle\langle\varphi|\hat{A}\rho_i\rfloor}{Tr\lfloor |\varphi\rangle\langle\varphi|\rho_i\rfloor}. \tag{4}$$

Note that the weak value of a Hermitian observable can in general be complex valued, and even when real valued, it can lie outside the observable's eigenspectrum.

FIG. 4 shows a tabular view 400 of a Weak Measurement QKD Protocol outline. These procedures include transmitting encoded bits 410, weak measuring 420, results sharing 430, and post-processing 440. In operation 410, Alice 110 generates a length 2n random string of bits $z \in \{0,1\}^{(2n)}$, encoding each bit in either the X or Z basis uniformly at random. The X and Z basis states denote mutually orthogonal and normalized vectors in abstract inner product of Hilbert space. Then she transmits each qubit to Bob 120, who performs weak measurements 420 of observables $\hat{H}^+$ or $\hat{H}^-$ chosen uniformly at random on each signal he receives. Then he strongly measures the qubits in the Z basis, recording both of his measurement results. Bob openly shares the weak measurement results with Alice, who uses them to estimate the bit and phase error rates 430. If the error rates are too high, she aborts the protocol. If the error rates are sufficiently low, Alice announces which signals were prepared in the Z basis. Alice and Bob perform classical post-processing 440 on these signals to correct the errors and distill a smaller, length k secure key.

If the weak measurement results are conditioned only on a particular (possibly mixed) initial state $\rho_i$, then the shift in the weak MD's wavefunction equals the average of the weak values over all post-selected outcomes. Thus, the weak measurements yield the expectation value $\langle \hat{A} \rangle_{\rho_i}$ of $\hat{A}$ at $\rho_i$. Intuitively, if a state was initialized as a pure state $\rho_i$, and then evolved to some other density operator $$\rho_i'$$

immediately prior to weak measurement of some observable $\hat{A}$, then the difference between the expectation value $\langle \hat{A} \rangle_{\rho_i}$ and the observed expectation value $\langle \hat{A} \rangle_{\rho_i'}$ can be expected to provide some insight into the evolution $$\rho_i \rightarrow \rho_i'.$$

Characterizing the extent to which this intuition holds for the exemplary QKD protocol is presented in Section IV.

Section III Introducing a Weak Measurement Based Protocol: View 400 for Table 1 shows an example prepare-and-measure QKD protocol that utilizes weak measurements for parameter estimation. Aside from the parameter estimation methods, there is another striking difference between the exemplary protocol and BB84, namely that the key is only generated from signals prepared and measured in the Z basis. Obviously, one could construct an equivalent protocol in which Bob only measures in the X basis. Consequently, assuming one augments the standard BB84 protocol with the above weak measurement steps, this can be effectively equivalent to implementing the above protocol twice. Bob's random selection in which basis to measure can be viewed as an interleaving of the two protocols.

By utilizing the weak measurement results, the parameter estimation is no longer dependent on Bob's final basis choice. Consequently, neither randomness nor secrecy of Bob's basis choice need be assumed. The degree to which a weak measurement interaction disturbs the signal is a direct function of the interaction coupling constant g. As a controllable parameter, its value can be reduced to be sufficiently small so as to be effectively negligible. Consequently, weakly measuring every signal has a negligible effect on the key rate. One can explicitly calculate the disturbance caused by the weak measurement interaction and its effect on the key rate in Section V.

FIG. 5 shows a geometric view 500 of the relationship between the $\hat{H}^\pm$ projectors, their complements $$\hat{H}_\perp^\pm$$

and the projectors onto the four states used in BB84. A circle 510 depicts the related projectors plotted thereon, defined along a horizontal axis 520 and a vertical axis 530. The projectors on the circle 510 include left $|-\rangle\langle -|$ and right $|+\rangle\langle +|$ respective intersections 540 and 550 with the horizontal axis 520, top $|0\rangle\langle 0|$ and bottom $|1\rangle\langle 1|$ respective intersections 560 and 570 with the vertical axis 530, and the observables: negative $\hat{H}^-$ 580, its perpendicular complement $$\hat{H}_\perp^-$$

585, positive $\hat{H}^+$ 590 and its complement $$\hat{H}_\perp^+$$

595.

With respect to the weak measurements, of particular interest will be in the two Hamiltonian observables:

$$\hat{H}^+ \equiv \frac{1}{2}\left[\hat{I} + \frac{1}{\sqrt{2}}(\hat{Z} \pm \hat{X})\right]. \tag{5}$$

Another pair of weak measurement observables that could be used to provide the same information as observables $\hat{H}^\pm$ are the trace-zero observables:

$$\hat{S}^\pm = \hat{H}^+ - \hat{H}_\perp^+ = \frac{1}{\sqrt{2}}(\hat{Z} \pm \hat{X}). \tag{6}$$

For concreteness, however, one can simply focus on observables $\hat{H}^\pm$. View 500 demonstrates the geometric relationship between those observables, their complements $$\hat{H}_\perp^\pm,$$

and the projectors onto the four states used in the standard BB84 protocol in the density operator framework. While in principle, Bob can possibly measure both $\hat{H}^+$ 590 and $\hat{H}^-$ 580 on each signal, it is practically easier and, as explained in Section VII, advantageous for the protocol's security for Bob to randomly choose one of the observables to measure on each signal.

Section IV Parameter Estimation with Weak Measurements: Lo (1999) provided the first publication to rigorously relate the security of QKD against arbitrary attacks to entanglement distillation. Doing so demonstrated that the ability of Alice 110 and Bob 120 to distill a secure key from their correlated signals is precisely a function of their signals coupling to the environment. Shor (2000) showed that entanglement distillation with one-way communication was equivalent to quantum error correcting codes. As a consequence of the fact that X errors are decoupled from Z errors in quantum error correcting codes, determining the X and Z error rates on the signals suffices to determine the coupling of the signal with the environment.

Gottesman (2004 or GLLP) further observed that the above holds under the assumption that the coupling is basis independent. In that case, the bit error rate $\delta_b$ directly measured from the signal X and Z errors, is approximately equal to the phase error rate $\delta_p$. Because $\delta_p$ cannot be directly measured, this phase parameter must be inferred. If Eve can leverage even a small amount of basis information, possibly through device imperfections, then equality cannot be assumed. However, if it is possible to bound this leakage, then Gottesman (2004) demonstrated that an upper bound could be imposed on how much larger than $\delta_b$ the phase error rate could be, and consequently security could be preserved. The general procedure for proving asymptotic security of any prepare-and-measure (PAM) QKD protocol is to design an equivalent entanglement distillation (ED) protocol. Once the ED protocol can be established as secure, the corresponding security of the PAM protocol follows. In that vein, one can first characterize an equivalent weak measurement ED protocol. The weak measurement parameter estimation step provides the primary fundamental difference between this ED protocol and the ones described in, e.g., Gottesman (2004), Lo (1999) and Shor (2000). In these asymptotic security proofs, a fundamental assumption holds that the bit error rate $\delta_b$ can be accurately estimated during parameter estimation. Consequently, provided one can demonstrate that the weak measurement parameter estimation step is accurate, then this assumption is validated, and security follows.

Subsection IV.1 Weak Measurement Entanglement Distillation Protocol: Consider the following entanglement distillation protocol:

1) Alice 110 creates n+m pairs of maximally entangled qubits 560 and 570:

$$|\phi^+\rangle^{\odot(n+m)} = \frac{1}{\sqrt{2}}(|00\rangle + |11\rangle)^{\odot(n+m)}, \qquad (7)$$

and sends half of each pair to Bob 120.

2) Alice selects a random subset of m of these signals to sacrifice as "check bits." On these signals, Alice randomly measures X or Z on her half of the entangled pair, while Bob performs weak measurements on his half of each the entangled pairs and broadcasts his weak measurement results, Alice estimates the error rates $\delta_X$ and $\delta_Z$. If the error rates are too high, they abort the protocol.

3) Assuming the error rates are below some predefined threshold, Alice and Bob perform entanglement distillation on the remaining n signals, extracting a smaller number $k \le n$ of high-fidelity entangled pairs from the n noisy ones.

4) Alice and Bob both measure Z on each of their k pairs, producing a k-bit shared random key about which Eve 130 has negligible information.

One can show that the ED protocol having one-way communication is equivalent to quantum error correcting codes by Shor (2000). In particular, using CSS codes, the bit errors are decoupled from the phase errors. Estimating both the bit and phase errors in the transmitted signals enables one to estimate how strongly coupled Eve's probe state is to the signal state. Because the key is determined from the subset of signals for which Alice 110 and Bob 120 both measure in the same basis, they only need to correct the bit errors. Because this can be accomplished using strictly classical error correction, Alice and Bob may just as well measure Z on the n noisy pairs, and then reserve error correction for the classical post-processing step. Furthermore, extracting k secure bits from the n shared (and now corrected) bits can be accomplished using classical hashing techniques by Lo (1999). Because Alice and Bob are no longer worried about waiting until after entanglement distillation to measure their states, they may as well use the weak measurement results of every signal to perform parameter estimation, reserving only the subset of signals for which Alice's and Bob's bases agree for key generation. In this way, the PAM protocol is equivalent to the ED protocol. Consequently, the security of the PAM protocol follows from the security of the ED protocol.

In order to obtain a secure key, then, it is imperative that Alice 110 and Bob 120 obtain accurate estimates of both the X and Z errors, respectively denoted $\delta_X$ and $\delta_Z$. In the standard approach to parameter estimation, Alice and Bob sacrifice a random subset of signals prepared in each basis to be used as "check bits" from which they may obtain decent estimates of these two parameters as long as Bob measures in the same basis each check bit signal was prepared. Now, if Eve 130 were to know in advance which signals were going to be used as check bits, then she could avoid interacting with those signals altogether so that Alice and Bob's estimates would not be correlated with the actual error parameters on the remaining signals. In order to ensure Eve does not know in advance which signals are check bits, Alice keeps this information secret until after Bob receives her signals. Ideally, Bob would want to keep his signals in a quantum memory until after Alice announces which signals are check bits. Then, Alice can tell Bob in which basis to measure each check bit. Assuming the error rates are sufficiently low, Alice can now safely reveal the basis information on the remaining signals to Bob, so that he can measure accordingly.

In practice, however, Bob has no quantum memory. In prepare-and-measure protocols, the workaround is for Bob to measure each signal as it arrives, and effectively guess the preparation basis. If his guess is a basis different from the one in which the state was prepared, then his measured result is completely uncorrelated with the signal Alice transmitted. Consequently, these signals cannot be used either for key generation or for parameter estimation, so they are removed from each list. The last point is of critical importance—in the standard approach to parameter estimation, Bob must measure in the correct basis in order for his measurement results to reveal any information about the channel parameters. For this reason, the standard method of parameter estimation cannot be independent of Bob's measurements. This critical dependence has been utilized repeatedly to hack QKD protocols by Gerhardt (2011), Lydersen (2010), Makarov (2016) and Sajeed (2016).

By taking control over Bob's detectors, Eve can assure that the signals that could best detect her interactions will never be used for parameter estimation. While the parameters estimated in a successfully implemented intercept-resend attack with detector blinding will accurately reflect the error estimates along the subset of received signals to be used for key generation, they are not an accurate characterization of the error parameters over the entire collection of signals that Bob received. This weakness has led to the development of Measurement-Device-Independent QKD (MDI-QKD) protocols by Curty (2014), Lo (2012), Tang (2014), Valivarthi (2015) and Xu (2013) that eliminate Bob's detectors altogether. To achieve this, MDI-QKD protocols perform parameter estimation and key generation based on the results of a joint Bell measurement on both Alice's and Bob's signals. This Bell state measurement is probabilistically implemented by two-photon interference at the receiver. By replacing Bob's detectors with an additional source, Eve can only leverage device imperfections that leak information to optimize her attacks, rather than altogether controlling Bob's basis choices.

Weak measurements, on the other hand, provide a fundamentally novel avenue for parameter estimation that, like MDI-QKD, is not dependent on Bob's final measurements. Unlike the standard approach to parameter estimation, a weak measurement does not appreciably disturb the signal. Thus, rather than sacrificing a small percentage of the total number of received signals for parameter estimation, one may sacrifice a small percentage of each signal for parameter estimation. Because the error information is obtained from the weak measurement results and not Bob's final measurement, what Bob does with these signals afterwards does not matter from a parameter estimation perspective. Consequently, Bob may as well strongly measure every signal as it arrives, and furthermore may measure all of them in the same basis. The security benefits of weak measurements are now apparent. In the standard method of parameter estimation, if Eve has complete control of Bob's detectors, she can enforce that certain of her interactions with the signal will be removed from the parameter estimation step. With weak measurements of the $\hat{H}$ projectors, on the other hand, this line of attack is completely avoided by the fact that every signal Bob receives contributes an equal amount of information for parameter estimation.

Subsection IV.2 Estimating the Error Parameters from Expectation Values: In principle, one can to weakly measure both observables on each signal. For practical reasons (as shown in Section VII) however, to maximize the protocol's security, one can suppose that immediately prior to Bob's final measurement in the Z basis, he randomly chooses one of the $\hat{H}$ observables from eqn. (5) to weakly measure on the arriving signal, and records his results. By averaging these measurement results over many signals, and then conditioning on each of the four possible initial states, Alice and Bob can obtain precise estimates of the expectation values for each of the $\hat{H}$ observables at each of the initial states.

Using the Bloch representation, an arbitrary qubit density operator $\rho$ can be decomposed as:

$$\rho = \frac{1}{2}(I + r_x X + r_y Y + r_z Z),$$  (8)

for some integer parameter $r_x, r_y, r_z \in [-1,1]$. The expectation value of $\hat{H}^{\pm}$ at $\rho$ is then given by trace:

$$\langle \hat{H}^{\pm} \rangle_\rho = Tr(\hat{H}^{\pm} \rho) = \frac{1}{2}\left(1 + \frac{r_z \pm r_x}{\sqrt{2}}\right).$$  (9)

From this, one obtains:

$$r_x = \sqrt{2}(\langle \hat{H}^{+} \rangle_\rho - \langle \hat{H}^{-} \rangle_\rho),$$  (10)

$$\text{and } r_z = \sqrt{2}(\langle \hat{H}^{+} \rangle_\rho - \langle \hat{H}^{-} \rangle_\rho - 1),$$  (11)

Now from $r_x$ and $r_z$ one arrives at the error parameters $\delta_X$ and $\delta_Z$.

More explicitly, let:

$$\rho_a := \frac{1}{2}(I + r_x^a X + r_y^a Y + r_z^a Z)$$  (12)

denote the density operator that characterizes the state of a signal initially prepared as $|\alpha\rangle\langle\alpha|$ a after being subjected to the quantum channel, where $\alpha \in \{0,1,+,-\}$. Under the assumption that each signal was transmitted with equal probability, it follows that:

$$\delta_X = \frac{1}{4}(2 - r_x^+ + r_x^-),$$  (13)

and $$\delta_Z = \frac{1}{4}(2 - r_z^0 + r_z^1).$$  (14)

If the qubit channel is unital, it follows that $$r_x^+ = -r_x^- \text{ and } r_c^0 = r_z^i,$$

so that the above errors simplify to:

$$\delta_X = \frac{1}{2}\left(\frac{1 - r_x^+}{2}\right) = \frac{1}{2}\left(\frac{1 + r_x^-}{2}\right),$$  (15)

and $$\delta_Z = \frac{1}{2}\left(\frac{1 - r_z^0}{2}\right) = \frac{1}{2}\left(\frac{1 + r_z^1}{2}\right),$$  (16)

Furthermore, one has:

$$\langle \hat{H}^{\pm} \rangle_{\rho_\alpha} + \langle \hat{H}^{\pm} \rangle_{\rho_{\alpha\perp}} = 1,$$  (17)

where $|\alpha_\perp\rangle$ is defined to be the orthogonal complement of $|\alpha\rangle$, for $\alpha \in \{0,1,+,-\}$.

Suppose the coupling strengths of the weak measurement of $\hat{H}^{\pm}$ are given by $g^{\pm}$, respectively. Then conditioning on the subset of signals prepared in the state $|\alpha\rangle\langle\alpha|$, the averages of the weak measurement results tend toward the values:

$$\mu_\alpha^+ = g^+ \langle \hat{H}^+ \rangle_{\rho_\alpha},$$  (18)

and $$\mu_\alpha^- = g^- \langle \hat{H}^- \rangle_{\rho_\alpha}.$$  (19)

Consequently, by eqn. (17) one obtains coupling strengths:

$$g^+ = \mu_\alpha^+ + \mu_{\alpha\perp}^+, \tag{20}$$

and $$g^- = \mu_\alpha^- + \mu_{\alpha\perp}^-. \tag{21}$$

Thus, the coupling parameters need not be known in advance. That is to say, one may permit the possibility that Eve 130 secretly controls the coupling parameter, or that it may change over time due to hardware imperfections, and estimate the parameter separately in each round of key generation. After Bob 120 receives sufficiently many signals, he publicly broadcasts the choice of weak measurement observable and corresponding weak measurement results for each signal he receives. Because Alice 110 is the only individual who knows which signals were transmitted, she is the only one who can condition the weak measurement results according to the initial states. She uses the weak measurement results of every signal Bob receives in order to perform parameter estimation accordingly.

A natural question to ask is why the two observables $\hat{H}^\pm$ were chosen. Indeed, one may envision a potentially far simpler weak measurement based protocol in which Bob weakly measures $\hat{X}$ on each signal, and strongly measures $\hat{Z}$. In this version, $\delta_Z$ could be calculated in the traditional way using a sample of signals prepared and measured in the Z basis, while $\delta_X$ could be estimated from the weak measurement results of signals prepared in the X basis using methods similar to that above. Indeed, such an approach would work well under the assumption that the weak measurements were implemented perfectly. However, if there are device imperfections, or if Eve has any control over the weak measurement interactions, then this example no longer becomes secure. The projectors $\hat{H}^+$ and $\hat{H}^-$ were chosen precisely because they provide the same amount of information about both the X and Z bases. This enables the protocol to extract an equal amount of information about both error rates for every signal received.

One should note that Gottesman (2004) used the bit error rate $$\delta_b \approx \frac{1}{2}(\delta_X + \delta_Z).$$

Because the key is only extracted from signals prepared and measured in the Z basis in the weak measurement protocol, one may be naïvely compelled to assign $\delta_b = \delta_Z$ and $\delta_p = \delta_X$ in the weak measurement protocol. However, $\delta_p = \delta_X$ applies only under the assumption that Eve's attack is basis independent, so that the bit-flip errors on signals prepared in the X basis are representative of the phase-flip errors on the signals prepared in the Z basis. Moreover, assuming this assumption of basis independence is true, then by necessity $\delta_p \approx \delta_b$, in which case, $$\delta_b \approx \frac{1}{2}(\delta_X + \delta_Z)$$

trivially holds. By the concavity of entropy, the following necessarily holds for all $\delta_X$ and $\delta_Z$:

$$1 - 2H_2(\delta_b) \leq 1 - 2H_2(\delta_X) - H_2(\delta_Z), \tag{22}$$

where $H_2$ is the binary entropy function. Hence, there is no reduction in security by choosing $\delta_b$ to estimate the bit error rate, even if the assumption of basis independence does not hold. Furthermore, as described subsequently, adversarial attempts to leverage weak measurement device imperfections to decrease the estimate of $\delta_X$ generally increases the estimate of $\delta_Z$ and conversely. The effect of weak measurement imperfections on the protocol's error estimates is analyzed in Section VI.

Section V Effect of Weak Measurement Disturbance on Key Rate: Because even weak measurements will disturb the qubits being measured, the actual quantum bit error rate (OBER) will be somewhat larger than what is estimated from the weak measurement results. One calculates this additional error rate and show it has a very small effect on the secure key rate. Because one focuses only on the contribution to $\delta_X$ and $\delta_Z$ due to the weak measurement backaction, one can assume that the state just before Bob's weak measurement is pure. Let that state be the unital qubit state:

$$|\psi\rangle = \alpha|H_\perp\rangle + \beta|H\rangle \tag{23}$$

written in the H basis. Then, just after the interaction implementing the weak measurement of $|H\rangle\langle H|$, using a Gaussian measurement device (MD) wavefunction with variance $\sigma^2$ for the weak measurement pointer state, the following for the MD and qubit combined system can be written:

$$\begin{aligned}
\rho = {} & |\alpha|^2 |H_\perp\rangle\langle H_\perp| \left(\frac{1}{\sigma\sqrt{2\pi}}\right) \int e^{-x^2/4\sigma^2} \int e^{-y^2/4\sigma^2} |x\rangle\langle y| dxdy + \\
& |\beta|^2 |H\rangle\langle H| \left(\frac{1}{\sigma\sqrt{2\pi}}\right) \int e^{-(x-g)^2/4\sigma^2} \int e^{-(y-g)^2/4\sigma^2} |x\rangle\langle y| dxdy + \\
& \alpha\beta^* |H_\perp\rangle\langle H| \left(\frac{1}{\sigma\sqrt{2\pi}}\right) \int e^{-x^2/4\sigma^2} \int e^{-(y-g)^2/4\sigma^2} |x\rangle\langle y| dxdy + \\
& \alpha^*\beta |H\rangle\langle H_\perp| \left(\frac{1}{\sigma\sqrt{2\pi}}\right) \int e^{-(x-g)^2/4\sigma^2} \int e^{-y^2/4\sigma^2} |x\rangle\langle y| dxdy,
\end{aligned} \tag{24}$$

where $\alpha$ and $\beta$ denote coefficients and the asterisk denotes their complex conjugates.

Tracing out the MD gives the density operator for the qubit after the weak measurement interaction, one has Trace:

$$\begin{aligned}
\rho_{qubit} = {} & Tr_{MD}(\rho) = \int \langle x|\rho|x\rangle dx \\
= {} & |\alpha|^2 |H_\perp\rangle\langle H_\perp| + |\beta|^2 |H\rangle\langle H| + e^{-g^2/8\sigma^2}(\alpha\beta^* |H_\perp\rangle\langle H| + \\
& \alpha^*\beta |H\rangle\langle H_\perp|) \\
= {} & e^{-g^2/8\sigma^2} |\psi\rangle\langle\psi| + \left(1 - e^{-g^2/8\sigma^2}\right)\left(|\alpha|^2 |H_\perp\rangle\langle H_\perp| + |\beta|^2 |H\rangle\langle H|\right).
\end{aligned} \tag{25}$$

The last expression shows that the qubit density operator is a mixture of the undisturbed original state and collapses onto each of the two $\hat{H}$ basis states. Using the BB84 input states, one can show that the probability for the weak measurement to collapse the unital qubit state into its orthogonal state is:

$$\delta_{wm} = \frac{1}{4}\left[1 - \exp\left(-\frac{g^2}{8\sigma^2}\right)\right] \tag{26}$$

for all four unital qubit states and for the weak measurement of either $\hat{H}^{\pm}$ projector. This means that the weak measurement disturbance acts as a depolarizing channel with an error probability given by $\delta_{wm}$ that must be added to the estimate of the OBER.

To verify that the weak measurements are indeed weak, as well as to accurately estimate the weak measurement induced error rate, one should estimate the variance of the weak measurement results, $$\mathrm{Var}\lfloor \mu_\alpha^{\pm} \rfloor,$$

in addition to $g^{\pm}$. As Section VII will show, estimating $$\mathrm{Var}\lfloor \mu_\alpha^{\pm} \rfloor$$

also provides a very strong defense against Eve successfully breaking the protocol if one grants Eve the ability to directly control the weak measurement results. While that the weak measurement pointer can be assumed to be a real valued Gaussian wavefunction, very similar results hold for any MD wavefunctions that are real valued and symmetric, i.e., $|\varphi(x)|=\varphi(-x)$, as shown by Silva (2015). For a practical quantum optical weak measurement, the ratio of the coupling strength and MD pointer position uncertainty can be less than 0.10. For weak measurements of this strength, the measurement induced error is $\delta_{wm}{<}0.0004$. Thus, even for practical, non-zero strength weak measurements, the induced error rate from the weak measurements is less than 0.1%.

Figures 6, 7:
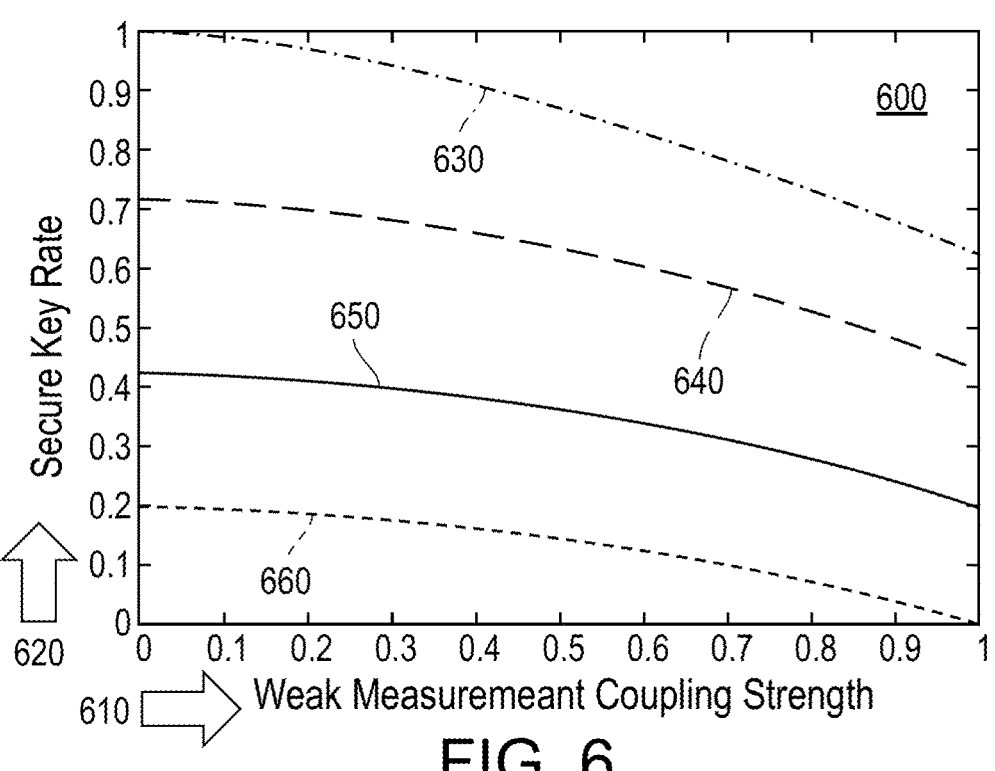
FIG. 6 is a graphical view of key rates variation with coupling strength.
FIG. 7 is a graphical view of angular shifts in observables.

FIG. 6 shows a graphical view 600 of the reduction in key rate as a function of the coupling strength $(g/\sigma_{MD})$ when the signals are subjected to varying degrees of depolarizing noise. Coupling strength 610 denotes the abscissa while secure key rate 620 denotes the ordinate. The curves 630, 640, 650 and 660 respectively represent 0%, 2%, 5%, and 8% error channel rates. In particular, one can observe that in an otherwise noiseless quantum channel, setting the coupling strength to 0.10 reduces the overall key rate by less than one percent, becoming much less than this when the coupling strength is no longer the dominant source of noise. The graphical view 600 features the reduction in secure key rate as a function of the coupling strength $(g/\sigma_{MD})$ when the signals are subjected to depolarizing noise with a channel error rate of 0% 630, 2% 640, 5% 650, and 8% 660. For the sake of simplicity, key rates R were calculated here using the idealized $R=1-2H_2(\text{QBER})$, where $H_2$ is the binary Shannon entropy, and the QBER is the sum of the channel noise and $\delta_{wm}$.

Section VI Security of Parameter Estimation: As previously explained, in order to estimate Eve's coupling to the quantum signal, one must obtain accurate estimates of both the X and Z error rates on the signal. Consequently, the security of the protocol can be reduced to an analysis of the accuracy of the parameter estimation step in an adversarial environment. In the ED protocol, there is an implicit assumption that Eve's coupling with the signals is independent of whether or not a given signal is used for parameter estimation. Under this assumption, the parameter estimates performed on the subset of signals used as check bits will be an accurate reflection of the parameters on the full collection of signals. This assumption is not needed in the weak measurement PAM protocol, as every signal Bob receives contributes some information towards parameter estimation.

Consequently, one may assume without any loss of generality, or any reduction in security, that Eve cannot condition her interactions with the signals based on whether they are used for parameter estimation. The security analysis in the various scenarios all take the following assumption as given:

Assumption 1: Eve cannot manipulate the signal in the interval between the weak measurement interaction and Bob's final measurement. The parameters estimated from the weak measurements are assumed to characterize properties of the signal leading up to the moment of weak measurement. This assumption enables one to decouple the parameter estimation from its dependence on Bob's detectors, and can be physically enforced by making these weak measurement interactions immediately prior to Bob's strong measurement. This is so that the path between the weak and strong measurements is very small and is entirely contained inside of a secured portion of Bob's signal measurement device (MD). This corresponds essentially to the assumption that Eve has not covertly placed any qubit-altering components or measuring apparatus inside this small, secured portion of Bob's MD.

Security analysis under the assumption of accurate parameter estimation has been thoroughly investigated in, e.g., Gottesman (2004), Lo (1999) and Shor (2000). Because their results are immediately applicable to the weak measurement QKD protocol provided the weak measurement parameter estimations remain accurate, this security analysis is reduced to an analysis of the accuracy of the parameter estimation step, as explicit by the following. Remark: The security of the weak measurement QKD protocol is considered preserved with aforementioned asymptotic security if the estimated quantum bit error rate is either above the security threshold or at least as large as the actual quantum bit error rate. The following is an immediate consequence: Theorem 1—Security of the weak measurement QKD protocol is preserved under the assumption that (a) Bob implements his weak measurements perfectly, (b) leaks no information about his choice of weak measurement observable, and (c) Eve cannot manipulate the weak measurement observables. In other words, if weak measurement parameter estimation is idealized, then beyond the fact that Eve can no longer implement any detector basis-dependent attacks, the asymptotic security analysis is no different than that of BB84.

Various scenarios can be considered with practical imperfections in the implementation of the protocol, and verify preservation of security, as in Remark 1, for each. As will be demonstrated, device imperfections may sometimes cause the parameter estimates to differ from the actual parameter values. For notational clarity, one can distinguish an estimate of a parameter determined by the weak measurement results from the actual parameter value by placing a tilde over the parameter.

Figures 8, 10:
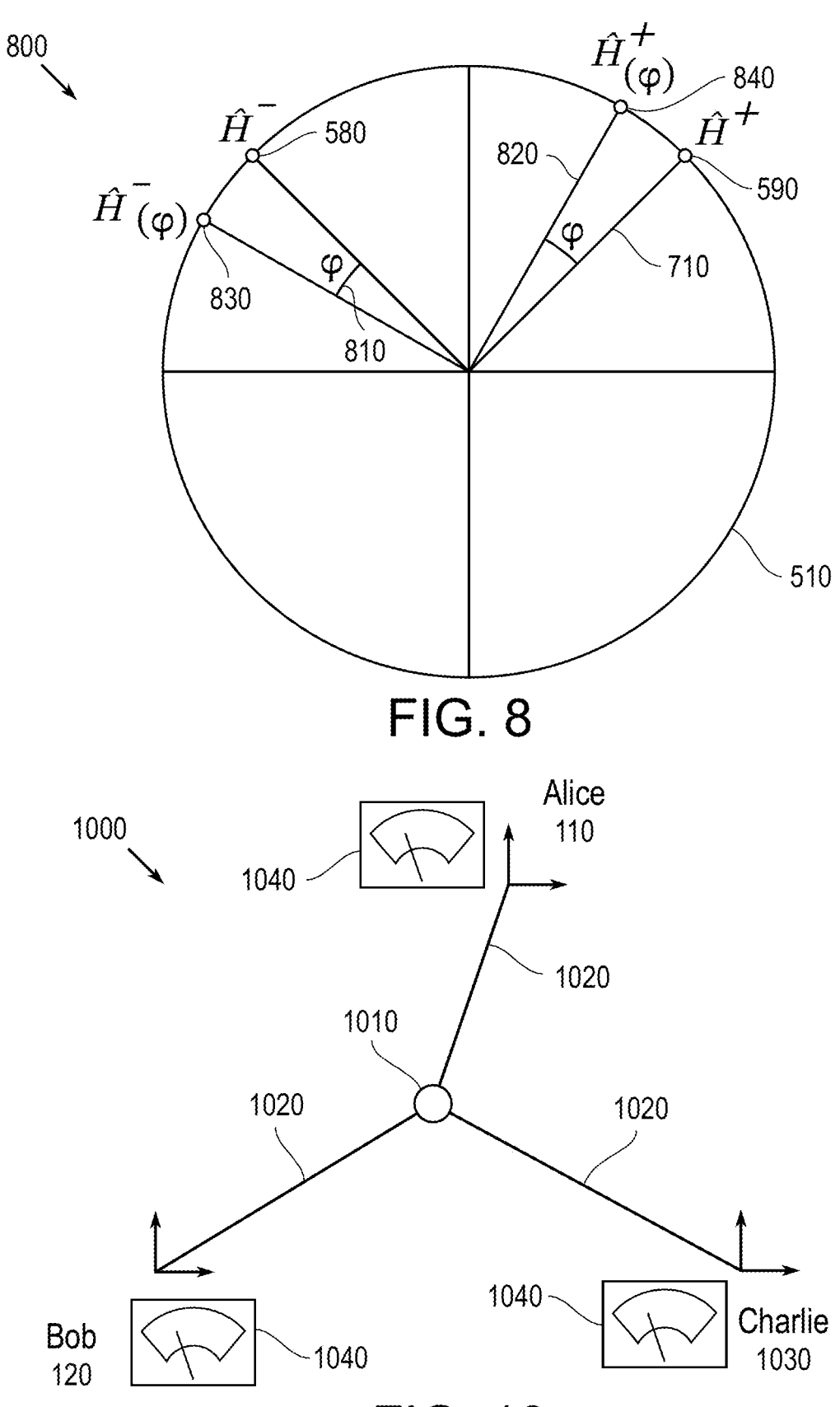
FIG. 8 is a graphical view of uncertainty bias in observables.
FIG. 10 is a diagram view of a communication with measurements.

Subsection VI.1 Imperfect Weak Measurements: FIG. 7 shows a graphical view 700 of the imprecise observables relations. The observables $\hat{H}^-$ 580 and $\hat{H}^+$ 590 on the circle 510 include respective uncertainties 710 denoted by angular sweeps 720 of half-angle $\theta$ covering wedge conical areas 730. If the weak measurement interactions are imprecise, then the observable weakly measured on any given signal may actually be another projector "near" the correct one. FIG. 8 shows a graphical view 800 for a depiction of biased weak measurement observables. Anti-clockwise rotation of observables $\hat{H}^-$ 580 and $\hat{H}^+$ 590 along the circle 510 by an

19 angular shift 810, corresponding to rotational bias φ, shifts the unital radial position 710 to a shift radial position 820. This yields respective offset observables Ĥ⁻(φ') 830 and Ĥ⁺(φ) 840.

Let one suppose that when Bob performs a weak measurement interaction, there is a small degree of uncertainty with respect to which observable he is weakly measuring. More specifically, for any given signal, the observable Bob actually measures is a projector that lies within some cone 730 of half-angle θ around the correct projector as shown in view 700. In this case, one should expect the average of the weak measurement results to be given by:

$$\mu_\alpha^\pm = g^\pm \int_{-\theta}^{\theta} \langle \hat{H}^+(\varphi) \rangle_\alpha \text{Prob}(\varphi) d\varphi \quad (27)$$

where Prob(φ) is the probability distribution for rotation φ 810 and observable Ĥ⁺(φ) is the projector given by:

$$\hat{H}^\pm(\varphi) := \frac{1}{2}\left[I \pm \sin\left(\frac{\pi}{4} + \varphi\right)X + \cos\left(\frac{\pi}{4} + \varphi\right)Z\right]. \quad (28)$$

If one further assumes that the noise applied to the projectors angle is additive Gaussian noise around the intended angle with variance $$\sigma_\varphi^2,$$

then the estimated mean pointer shift is unchanged, $$\mu_\alpha^\pm = g^\pm \langle \hat{H}^+(\varphi) \rangle_\alpha, \quad (29)$$

while the estimated variance of the pointer shift has an additional component defined by the imprecision of rotation φ. For small degrees of imprecision, with variance $$\sigma_\varphi^2 \ll 1,$$

the variance in the weak measurement pointer results are now given by:

$$\text{Var}[\mu_a^\pm] = (g^\pm)^2\left(\sigma_{MD}^2 + \frac{1}{4}\sigma_\varphi^2\right). \quad (30)$$

Thus in the limit of many signals, the average weak measurement results will be unaffected, and δ_X and δ_Z are unchanged. However, the estimated variance of the weak measurements increase due to the imprecision of the angle 720 determining the projectors. Because Alice and Bob use the estimated variance to place an upper bound on the weak measurement induced bit error rate, δ_wm, they must impose an upper bound, $$\sigma_\varphi^U,$$

20 on the amount of permissible noise in the weak measurement interaction implementation. Using this upper bound on the implementation inaccuracy, Alice and Bob estimate the lower bound on the weak measurement pointer variance using:

$$\sigma_{MD}^2 \le \frac{\text{Var}[\mu_a^*]}{g^2} - \frac{1}{4}(\sigma_\varphi^U). \quad (31)$$

If Alice 110 and Bob 120 overestimate σ_MD then their estimate δ̃_wm of the weak measurement induced error rate will be smaller than the actual induced error rate δ_wm. However, with an appropriate safety margin built into upper bound $$\sigma_\varphi^v,$$

the protocol will work property. If the noise in the angle is stationary and accurately characterized, then in the limit of infinitely long key, the bound on measurement pointer variance σ_MD can be tightened and the secure key rate is unchanged. Thus as can be shown:

Theorem 2—Suppose that Bob's implemented weak measurement projectors range over a small bounded region, with a Gaussian distribution symmetric about the correct projectors, but Eve otherwise has no direct control over the weak measurements. Then the security of the weak measurement QKD protocol is preserved.

Subsection VI.2 Biased Weak Measurements: Previously, the scenario of imperfect weak measurements were presented as yet unbiased. One can consider what happens when the implemented weak measurement observables are biased by a fixed amount away from the correct observables in one direction. In other words, suppose that Eve 130 has some method of rotating the weak measurement interaction, unbeknownst to Alice 110 or Bob 120, as shown in view 800. Even in this strongly adversarial environment, obtaining nonzero secure key nonetheless remains possible. In fact, any rotation φ of turn 810 of both of the weak measurement observables 580 and 590 only serves to increase, rather than decrease, the estimated error, and hence preserve security. More precisely, one can suppose that, whenever Bob intends to weakly measure Ĥ⁺, what he actually weakly measures is Ĥ⁺(φ), for some fixed φ∈≤(−π,π), where Ĥ⁺(φ) is defined in eqn. (26). Then the expectation values ⟨Ĥ⁺(φ)⟩ change according to:

$$\langle \hat{H}^\pm(\varphi) \rangle_{\varphi_a} = \frac{1}{2}\left[1 \pm r_x^a \sin\left(\frac{\pi}{r} + \varphi\right) + r_z^a \cos\left(\frac{\pi}{4} + \varphi\right)\right]. \quad (32)$$

If the actual error rates are given by eqns. (15) and (16), then using eqns. (10) and (11), the calculated error rates will be given by:

$$\tilde{\delta}_X = \frac{1}{2} - \frac{r_x^+}{2}[\cos(\varphi) + \sin(\varphi)], \quad (33)$$

$$\tilde{\delta}_Z = \frac{1}{2} - \frac{r_z^0}{2}[\cos(\varphi) - \sin(\varphi)]. \quad (34)$$

Any rotation φ that decreases one of the error estimates always increases the other. The value of using $\delta_b$ as an estimate of the bit error rate is now apparent, rather than treating $\delta_X$ and $\delta_Z$ separately. To be more precise, if the actual values $\delta_X$ and $\delta_Z$ are nonzero, then there exist a range of values for the rotation φ to the weak measurement observables such that the calculated error rates $\tilde{\delta}_X$ and $\tilde{\delta}_Z$ permit the value:

$$\tilde{R} = \max(1 - H_2(\tilde{\delta}_X) - H_2(\tilde{\delta}_Z), 0) \tag{35}$$

to be strictly greater than the actual asymptotically achievable secure key rate:

$$R = \max(1 - H_2(\delta_X) - H_2(\delta_Z), 0). \tag{36}$$

See view 600 for some examples of this in the case of depolarizing noise.

Figure 9:
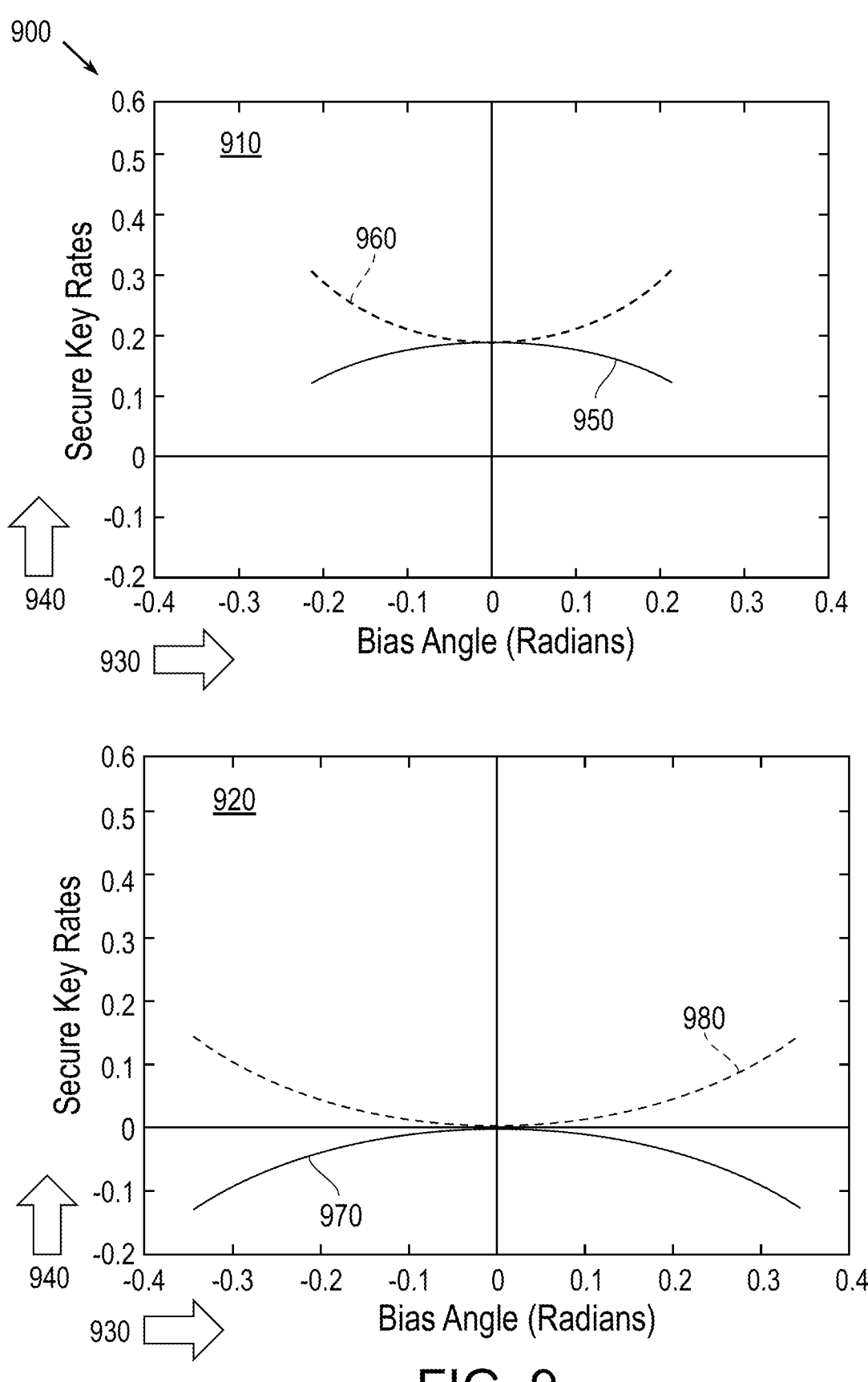
FIG. 9 is a graphical view of key rates variation with bias angle.

FIG. 9 shows graphical views 900 featuring calculated secure key rates. These can be expressed as upper plot 910 and lower plot 920. For each, bias angle 930 in radians denotes the abscissa and secure key rate 940 denotes the ordinate. The upper plot 910 features downward curve 950 and upward curve 960, intersecting at zero bias angle and 0.2 key rate. The lower plot 920 features downward curve 970 and upward curve 980, intersecting at zero bias angle and zero key rate.

$$\tilde{R} = 1 - H_2(\tilde{\delta}_X) - H_2(\tilde{\delta}_Z), \tag{37}$$

for upward curves 960 and 980 and $$\tilde{R} = 1 - 2H_2(\tilde{\delta}_b), \tag{38}$$

for downward curves 970 and 990 as a function of rotation φ when the weak measurement observables used to estimate the error rates are given by $\hat{H}^{\pm}(\varphi)$. The plots shown correspond to when the signals undergo depolarizing noise with a QBER of 8% for upper plot 910 and 11% for lower plot 920. The correct key rate is obtained when φ=0. The range of permissible values for rotation φ is limited to those for which both $\tilde{\delta}_X$ and $\tilde{\delta}_Z$ are non-negative. As can be seen, by slightly biasing the weak measurement observables in either direction, incorrectly determining that the achievable secure key rate is larger than actual remains possible if the $\delta_X$ and $\delta_Z$ error rates are treated independently. However, by averaging over the two error rate estimates to obtain $\tilde{\delta}_b$, one can overcome this vulnerability.

Assuming the ability to independently characterize the rotational bias φ applied to the weak measurement observables, then obviously one could infer the correct error rates. Alternatively, the apparent problem can be avoided by averaging the two calculated error rates. In other words, just as in Gottesman (2004), one calculates the bit error rate as:

$$\tilde{\delta}_b \approx \frac{\tilde{\delta}_X + \tilde{\delta}_Z}{2}. \tag{39}$$

This has the effect of "smoothing out" weak measurement device imperfections without reducing security. If Eve's attack is basis independent, then one can expect $\delta_X$ and $\delta_Z$ to be approximately equal, so that $\delta_X \approx \delta_Z \approx \delta_b$. Then under this assumption, the calculated asymptotically achievable secure key rate will be given by:

$$\tilde{R} = \max(1 - 2H_2(\tilde{\delta}_b), 0), \tag{40}$$

Consequently, $1 - 2H_2(\tilde{\delta}_b) \leq 1 - H_2(\delta_X) - H_2(\delta_Z)$ for all $\varphi \varepsilon \leq (-\pi, \pi)$, and in the case of depolarizing noise, equality is reached precisely when φ=0, i.e., when there is no biasing. Thus, one can show that:

Theorem 3—Security is preserved in the weak measurement QKD protocol in the event that, due either to a malicious Eve or simple device imperfections, the projectors that are actually weakly measured are uniformly biased by an arbitrary angle $\varphi \in \leq (-\pi, \pi)$. One could combine this with the analysis of the Section V. That is to say, it is still possible to obtain a nonzero secure key if the weak measurement observables that are actually measured are from a Gaussian distribution centered around observables $\hat{H}^{\pm}(\varphi)$. The above biasing can occur in entirely reasonable scenario involves the event that Alice's source and Bob's detectors are misaligned. In other words, if one can suppose that the $\hat{H}$ observables align properly with respect to Bob's detectors, but Alice's source is slightly rotated, then the effect on the weak measurements will be identical to the above scenario.

Subsection VI.3 Adversarial Knowledge of Bob's Choice of Weak Measurement Observable: Thus far, one assumes that any attack by Eve on the weak measurement interactions has been independent of Bob's choice of weak measurement observable. Because Bob will randomly choose one of the two observables to weakly measure on each signal in the implementation of the protocol, one can now concern ourselves with the possibility that Eve has some knowledge about this choice and attempts to use it to gain an advantage by selectively and independently rotating the weak measurement observables. The protocol can be shown to still be robust against such weak measurement biasing attacks, even if Eve has complete knowledge of the choice of observable.

Let one suppose that for each signal arriving at Bob's weak measurement interaction, Eve has some probability $$p_H \geq \frac{1}{2}$$

of correctly guessing Bob's choice of weak measurement observable. With this information, Eve chooses to bias the weak measurement observable one way or another on each signal. With complete information about Bob's choice of weak measurement observables, Eve could potentially rotate $\hat{H}^+$ one way and $\hat{H}^-$ another way in order to try to reduce Alice and Bob's estimated error rates. With only partial information about this choice, Eve must factor in the probability of rotating the wrong observable into her choice of optimal bias. Let one suppose that Eve tries to rotate $\hat{H}^+$ to $\hat{H}^+(\varphi)$ and $\hat{H}^-$ to $\hat{H}^-(\varphi')$. With probability $$p_H \geq \frac{1}{2},$$

Eve guesses correctly, in which case the calculated expectation values on each signal become $\langle \hat{H}^-(\varphi') \rangle_{\varphi_\alpha}$ and $\langle \hat{H}^+(\varphi) \rangle_{\varphi_\alpha}$. With probability $(1 - p_H)$, Eve guesses the incorrect observable, in which case the calculated expectation values on this subset become $\langle \hat{H}^+(\varphi) \rangle_{\varphi_\alpha}$ and $\langle \hat{H}^-(\varphi') \rangle_{\varphi_\alpha}$.

Eve's goal is to use her knowledge $p_H$ of Bob's choice of weak measurement observable to choose biases φ and φ' that minimize the estimated error rate $\tilde{\delta}_b$ from eqn. (39). Under the assumption of unital noise, her optimal choice for rotations φ and φ' is given by:

$$\tan(\varphi) = \frac{r_x^+ - r_z^+(2p_H - 1) - r_z^0 + r_x^0(2p_H - 1)}{r_x^+ + r_z^+(2p_H - 1) - r_z^0 + r_x^0(2p_H - 1)}, \qquad (41)$$

$$\tan(\varphi') = \frac{r_x^+ + r_z^+(2p_H - 1) - r_z^0 - r_x^0(2p_H - 1)}{r_x^+ + r_z^+(2p_H - 1) + r_z^0 - r_x^0(2p_H - 1)}, \qquad (42)$$

where $$r_x^q \text{ and } r_z^q$$

are as in eqn. (13). In particular, if the channel is depolarizing, then $$r_z^+ = r_z^0 \ 0 \text{ and } r_x^+ = r_z^0,$$

so that the optimal choice of bias becomes $\varphi=\varphi'=0$. That is to say, if the channel is depolarizing, then any biasing of the weak measurement observables will only serve to increase, rather than decrease the estimated error rate. Furthermore, in the arbitrary unital case, Eve's knowledge $p_H$ of the choice of weak measurement observable is only advantageous to her in the event that there is a rotation applied to the signals, so that $$r_z^+ \text{ and } r_x^0$$

are nonzero. One can consider the worst case scenario that Eve has complete knowledge of Bob's choice of weak measurement observable, so that $p_H=1$. One finds that, even in this case, under arbitrary unital noise, the estimated error rate $\tilde{\delta}_b$ becomes less than the actual error rate $\delta_b$ only after both error rates are below the 11% security threshold. Consequently, complete knowledge of Bob's choice of weak measurement observable, along with the ability to independently bias each of the weak measurement observables, provides no advantage to Eve. Thus, as has been shown: Corollary to Theorem 3—holds even when Eve has complete knowledge of Bob's choice of weak measurement observable and the ability to independently bias both observables.

Subsection VI.4 Weak Coherent Sources: Because nearly perfect deterministic single photon sources are not yet technologically feasible, a practical implementation of the exemplary QKD protocol can use weak coherent laser pulses with randomized phases to approximate single photons. Because even very weak coherent pulses will occasionally contain more than one photon, the weak measurement protocol, as with any other similar prepare and measure protocol, is vulnerable to a Photon Number Splitting (PNS) attack by Brassard (2000). The use of decoy states with different pulse intensities interspersed randomly with the signal pulses was proposed and developed as a method of securing QKD protocols against PNS attacks by Dixon (2008), Lo (2005), Ma (2005) and Wang (2005).

The essential idea is that to successfully extract information from the signal pulses, Eve needs to selectively apply a beam-splitter to pulses with multiple photons in order to extract information without increasing the bit error rate. This means that a PNS attack will necessarily cause appreciably higher attenuation of pulses with higher intensities by Mailloux (2015). This enables Alice and Bob to protect against such an attack by carefully measuring the attenuation of pulses produced with several intensities and using this to place a lower bound on the transmittance of pulses with single photons. When combined with information about the error rate of signal pulses, this enables Alice and Bob to place an upper bound on the error rate of pulses that contain single photons.

A decoy state protocol can be chosen with a signal pulse of average intensity $\mu$, a decoy state of average intensity v, with v=$\mu$, and a vacuum pulse with zero intensity. By using their knowledge of the pulse intensities and by carefully measuring the probabilities that the signal and decoy pulses produce a detection (i.e., the transmittances), $Q_\mu$ and $Q_v$, Alice 110 and Bob 120 can estimate a lower bound for the transmittance for those pulses that contain a single photon, i.e., the ideal case, per Ma (2005) would be:

$$Q_1^L = \frac{\mu^2 e^{-\mu}}{\mu v - v^2}\left[Q_v e^v - Q_\mu e^\mu \left(\frac{v}{\mu}\right)^2 - Q_{vac}\left(\frac{\mu^2 - v^2}{\mu^2}\right)\right], \qquad (43)$$

where $Q_{vac}$ is the detector click probability for the vacuum pulses.

If one attributes all of the bit errors to those pulses with single photons (the worst case for security as only pulses with single photons contribute to the secure key rate), then an upper bound on the bit error rate of single photon pulses is given by:

$$\varepsilon_1^U = \frac{\varepsilon_v Q_v e^v - \varepsilon_{vac} Q_{vac}}{Q_1^L e^\mu \left(\frac{v}{\mu}\right)}, \qquad (44)$$

where $\varepsilon_v$ and $\varepsilon_{vac}$ are the bit error rates for the decoy and vacuum pulses. From this, using the results of Ma (2005), one can calculate that a secure final key can be extracted from the sifted signal pulses at the asymptotic rate given by:

$$R = q\{Q_1^L[1 - H_2(\varepsilon_1^U) - Q_\mu f(\varepsilon_\mu)H_2(\varepsilon_\mu)]\}, \qquad (45)$$

where $f(\varepsilon_\mu)$ is given by the efficiency of the error reconciliation procedure used in the implementation and q is the fraction of the transmitter signal pulses that are in the sifted key, and q=½ just as in the standard BB84 protocol because half of the signal pulses will be in the Z basis. This decoy state analysis implicitly defines the bit error rate to be:

$$\varepsilon = \frac{\delta_X + \delta_Z}{2} = \delta_b. \qquad (46)$$

All that remains to arrive at the secure rate of the exemplary protocol is estimate the corresponding $\delta_b$ parameters from our weak measurement results for the signal, decoy, and vacuum pulses. Subsequently, the disclosure explains how to adapt the procedure in Section IV to accurately estimate these when the detectors have nonzero dark count rates. Additionally, if one can somehow be certain that the weak measurement observables are implemented with no bias as in Theorem 1, then one can estimate the corresponding $\delta_X$ and $\delta_Z$ error rates individually. From these, one can write an asymptotic bound that is higher than the one above whenever $\delta_X \neq \delta_Z$, given by:

$$R = q\{Q_1^L[1 - H_2(\delta_{X,1}^U) - Q_\mu f(\delta_{Z,\mu})H_2(\delta_{Z,\mu})]\}, \tag{47}$$

where $\delta_{Z,\mu}$ is the Z error rate estimated from the weak measurements of the signal pulses and $$\delta_{X,\mu}^U,$$

the upper bound of the X error rate for pulses containing a single photon, and is given by:

$$\delta_{X,\mu}^U = \frac{\delta_{X,\mu} Q_\nu e^\nu - \delta_{vac} Q_{vac}}{Q_1^L e^\mu \left(\frac{\nu}{\mu}\right)}, \tag{48}$$

where $\delta_{X,\nu}$ and $\delta_{X,vac}$ are the estimated X error rates for the decoy and vacuum pulses respectively. This disclosure segues to accurately estimate the error rates from the weak measurements when the detectors have nonzero dark count rates.

Subsection VI.5 Detector Dark Counts: Let one suppose that the single-photon detectors in the QKD system have a probability $p_d$ of producing a false detection signal within the detection time window. When there are significant optical losses in the channel, $p_d$ is the probability that a signal arrived at the detector with zero photons and that the detector produced a false positive within the detection window. For a coherent pulse transmitted with intensity $\gamma$, the probability of it containing zero photons is:

$$Q_0^\gamma - e^{-\gamma} Y_0 \approx Y_0, \tag{49}$$

where $Y_0$ is the yield of the vacuum pulses, i.e., detection events when the vacuum pulses are transmitted. Let $d_i$ be the dark count rate of detector i and $\tau$ be the detection window duration, then $Y_0 = (d_1 + d_2)\tau$. One can accurately estimate $Y_0$, by measuring the transmittance of the vacuum pulses in the protocol because:

$$Q_{vac} = Y_0 = (d_1 + d_2)\tau. \tag{50}$$

For a pulse prepared with an average intensity of $\gamma$ and with an observed transmittance $Q_\gamma$, the fraction of detection events due to detector dark counts, $d(\gamma)$, is given by:

$$d(\gamma) = \frac{(d_1 + d_2)\tau}{Q_\gamma}. \tag{51}$$

One can assume that Eve controls the dark count output of Bob's detectors. Signals arriving at the detectors containing no photons will not contribute to the weak measurements results. In fact, one should expect the average expectation value of the dark count signals for both weak measurement observables to be zero. Therefore, the averages of the weak measurement results for the signal pulses conditioned on the initial state $|\alpha\rangle$ and prepared with intensity $\gamma$ become:

$$\mu_{\alpha,\gamma}^\pm = [1 - d(\gamma)]g^+ \langle \hat{H}^\pm \rangle_{\rho_\alpha}, \tag{52}$$

One can observe that the dark counts will effectively make the estimated coupling parameter smaller than its actual value. Because one can estimate the $d(\gamma)$ parameters independently of weak measurement results using this information about the transmitted intensities and the observed transmittances, one can correct for this and accurately extract the expectation values from the observed weak measurements results using eqn. (52). From the $$\mu_{\alpha,\gamma}^\pm,$$

weak measurement averages, Alice and Bob can estimate the parameters $\tilde{\delta}_{i,\mu}$ and $\tilde{\delta}_{i,\nu}$ with $i \in \{X,Z\}$. However, these are the error rates for the fraction of the signals that arrive at the detector with non-zero intensities. To get the total estimated error rate one must add in the errors due to the observed dark counts with the proper proportion of vacuum and non-vacuum events:

$$\delta_{i,\gamma} = \frac{\tilde{\delta}_{i,\gamma}(Q_\gamma - Q_0) + \frac{1}{2}Q_0}{Q_\gamma} = \tilde{\delta}_{i,\gamma} + \left(\frac{1}{2} - \tilde{\delta}_{i,\gamma}\right)\frac{(d_1 + d_2)\tau}{Q_\gamma}, \tag{53}$$

with $\gamma$ the pulse intensity and $i \in \{X,Z\}$. These error rates can then be plugged directly into eqns. (48) and (47) or else eqns. (44) and (45) to find the asymptotically achievable secure key rate.

Section VII Towards Weak Measurement Device Independent Security: Thus far, this disclosure has demonstrated the robustness of the exemplary protocol against reasonable device flaws and some adversarial control over the weak measurement interactions. While the security of the parameter estimation is independent of Bob's post-selection, and therefore detector control by Eve, there remains the possibility that Eve could compromise the protocol's parameter estimation if she could somehow control the weak measurement outcomes themselves. One can demonstrate that, given a very weak restriction on Eve's information about which observable is weakly measured on each signal, the weak measurement protocol can withstand a very general and powerful class of attack strategies in which Eve has complete control of the weak measurement outcomes. In addition to Assumption 1, which prevents Eve from performing projective measurements of each photon after the weak measurement interaction and before the photon detectors, one can impose the following additional requirement on Eve's knowledge regarding the weak measurements:

Assumption 2—Eve has limited information about which observable, $\hat{H}^+$ 590 or $\hat{H}^-$ 580, Bob has chosen to weakly measure on each signal. More precisely, one assumes that Eve's ability to correctly guess which of the two observables Bob chooses to measure on each signal is bounded by some probability $$\frac{1}{2} \leq p_H < 1.$$

The precise limitation of Eve's knowledge required can be derived. In order to model Eve's control over the weak measurement results, we will treat the weak measurement device in the QKD system as a black box through which each signal passes immediately prior to being strongly measured at Bob's detectors. One can imagine that the inner working of the black box can be controlled by an agent of Eve called Fred. In addition to controlling the weak measurement outcomes, Fred is also assumed to have full information about Bob's choice of which observable he intends to be weakly measured for each signal. Eve is permitted to communicate freely with Fred, but Fred will have some limitation imposed on his ability to communicate with Eve. This limitation will impose a limit on Eve's probability $p_H$ of correctly guessing Bob's weak measurement observable choice for each signal. The general weak measurement attack strategy under consideration is the following:

(1) Eve will perform any attack on the quantum channel she desires, (2) Fred attempts to communicate the weak measurement observable choice to Eve, then (3) Eve uses her available information to instruct Fred on how to influence the weak measurement results that Bob records for each signal.

Whether or not these results are due to an actual measurement interaction is unimportant. Eve's goal is to influence the weak measurement results such that her interactions with the quantum channel are hidden, and therefore Alice and Bob will certify the channel as secure. The weak measurement protocol is not fully measurement-device independent. Nevertheless in MDI-QKD, the black box model of the weak measurement outcomes given above is somewhat analogous to the channel error rate estimation procedure. In MDI-QKD, both Alice's and Bob's signals are handed to an adversary, Charlie, who is responsible for making a Bell state measurement.

FIG. 10 shows a Hardy's paradox diagram view 1000 of these interactions. A source 1010 provides polarized signals 1020 separately to Alice 110, Bob 120 and Charlie 1030. Each has an empirical instrument 1040 to provide measured results. Charlie 1030 has the option of either publicly announcing the actual measurement result, or announcing some other value of his choosing. In order to verify that the results Charlie 1030 announces are correlated with the transmitted signals, Alice 110 and Bob 120 authenticate the measurement results by comparing to the expected results of the Hong-Ou-Mandel (HOM) interference of the two signal photons. Charlie's lack of knowledge about both Alice and Bob's signals prevent him from being able to fake the measurement results and pass the HOM interference test. In the WM-QKD protocol, there is no HOM interference test. However, one can conjecture that given the validity of Assumptions 1 and 2, Alice 110 and Bob 120 can still verify that the announced weak measurement results are correlated with the transmitted signals by placing three basic restrictions on the measurement results that can be easily verified as additional steps in the protocol. The first restriction is that the estimates for $\delta_X$ and $\delta_Z$ are both nonnegative. In the non-adversarial regime, this requirement will always be satisfied; however, this imposes a rather strong restriction on Eve's ability to fake the weak measurement results when she has limited knowledge of Bob's choice of weak measurement observable. The second check is that the variance of the measurement results is independent of the source. That is to say, the calculated variances of the weak measurement results conditioned on each initial state should be statistically identical.

As can be shown, Eve's attempts to fake the weak measurement results can sometimes affect the variance of the measurement outcomes differently depending on the source basis. The last check involves the variance of the weak measurement results being what one expects given the prescribed weak measure pointer state and interaction. That is to say, one can use eqn. (19) from Shor (2000) to bound the permissible variance of the weak measurement results. As the disclosure shows, an adversary cannot simultaneously fake the weak measurement results and satisfy all of these checks, even with limited access to both source basis information and Bob's choice of weak measurement observable. One can call these checks the "weak measurement verification" or "WM verification." The objective in the following is to demonstrate that, with limited side channel access to the source basis and Bob's choice of weak measurement observable, any weak measurement attack strategy by Eve 130 will either fail the WM verification or generate error rate estimates above the security threshold. Before characterizing several general attack strategies in detail, one can first write down the expectation values of $\hat{H}^+$ 590 and $\hat{H}^-$ 580 for each of the four input states with no channel noise. When the signal is encoded with bit value a in the Z basis and there is no channel noise, the expectation values are:

$$\langle \hat{H}^\pm \rangle_a = \frac{1}{2} + \frac{(-1)^a}{2\sqrt{2}}. \tag{54}$$

While the signal is encoded in the X basis has no channel noise, the plus sign is replaced with plus-or-minus:

$$\langle \hat{H}^\pm \rangle_a = \frac{1}{2} \pm \frac{(-1)^a}{2\sqrt{2}}. \tag{55}$$

As can be seen, the expectation values (and hence the weak measurement results) have encoded in them information about the source bit value. Consequently, one may be led to believe that the extent to which Eve can fake these expectation values will be limited by her knowledge of the source bit values. However, Eve can just as easily make a weak measurement of both observables on each signal before she performs any additional interaction with the signal. While Eve does not know the bit values, she does know that her weak measurement results are correlated with the raw key bit values. Consequently, one arrives at the first of three distinct attack strategies that utilize Eve's control of the weak measurement device (MD):

Attack Strategy 1

$$\left( p_{basis} = \frac{1}{2}, p_H \le 1 \right).$$

If Eve knows with certainty the weak measurement observable chosen for each signal, then Eve should make her own weak measurements of both $\hat{H}^+$ and $\hat{H}^-$ near the signal source and record these results. After her weak measurements of the signals, Eve then performs a strong Z basis measurement on the quantum channel and records the results. Finally, Eve uses her control of the weak MD to substitute her weak measurement results corresponding to the observable that Bob expects, while sending a copy of her strong measurement result to Bob's detectors.

This attack strategy is a very limited one due to the requirement of $p_H=1$. A natural question is whether or not Eve can utilize her own weak measurement results and her control over Bob's weak MD to compromise the protocol when $$\frac{1}{2} < p_H < 1.$$

Let one assume for now that Eve has no knowledge of Alice's preparation basis, so that her probability of correctly guessing the basis is $$p_{basis} = \frac{1}{2}.$$

One can conjecture that the most general strategy for this scenario is the following one. Eve replaces Bob's weak measurement results with a scalar multiple (actually an affine transformation) of her weak measurement results, in an attempt to leverage her knowledge of Bob's choice of weak measurement observable to manipulate the error estimates without any a priori knowledge of the encoded bit values. Note two crucial observations regarding the expectation values from eqns. (54) and (55). First, when the signals are encoded in the Z basis the expectation values of $\hat{H}^+$ and $\hat{H}^-$ are the same, while those encoded in the X basis have a sign difference in the second term. Second, by assumption, Eve does not have any information about the basis in which a given signal was prepared.

In the case of uniform noise, one should note that the X and Z errors are related to the true expectation values by:

$$\delta_X = \frac{1-r_x^+}{2} = \frac{1+r_x^-}{2},$$ (56)

and $$\delta_Z = \frac{1-r_z^0}{2} = \frac{1+r_z^1}{2},$$ (57)

where the r parameters are obtained from:

$$r_x^+ = \sqrt{2}(\langle H^+ \rangle_+ - \langle H^- \rangle_+),$$ (58)

and $$r_z^0 = \sqrt{2}(\langle H^+ \rangle_0 - \langle H^- \rangle_0 - 1).$$ (59)

Eve has the goal of altering Alice and Bob's estimate of these parameters such that the average of the two is as small as possible (or at least below the security threshold). As before, one can denote Alice and Bob's estimates of this as:

$$\tilde{\delta}_b = \frac{\tilde{\delta}_X + \tilde{\delta}_Z}{2} = \frac{1}{2} - \frac{1}{4}(\tilde{r}_x^+ + \tilde{r}_z^0),$$ (60)

where the tilde over the r's indicate these are derived from the fake weak measurement outcomes provided by Eve. Note that in the case of no channel noise:

$$r_x^+ = +1, r_x = -1,$$ (62)

and $$r_z^0 = +1, r_z^1 = -1.$$ (62)

This fact will form the basis of Eve's attack strategy to leverage her weak measurement results to attempt to break the protocol. If Eve only correctly guesses Bob's choice of weak measurement observable with probability $p_H<1$ and she knows nothing about the source basis, she can choose the weak measurement results given to Bob so that:

$$\Delta_{fp}(H^{\pm}) = \frac{g_{Eve}}{2} + \Delta_{\pm}^{Eve} - \frac{g_{Eve}}{2},$$ (63)

where $g_{Eve}$ is the coupling parameter for Eve's weak measurement interactions.

One can assume that Eve is smart enough to set $g_{Eve} \approx g$ in order not to raise the suspicions of Alice and Bob. From these fake weak measurement pointer results, Alice and Bob's estimates of the r parameters are given by:

$$\tilde{r}_x^+ = \sqrt{2}(\langle H^+ \rangle_+^{fake} - \langle H^- \rangle_+^{fake}),$$ (64)

$$\tilde{r}_x^0 = \sqrt{2}(\langle H^+ \rangle_0^{fake} + \langle H^- \rangle_0^{fake} - 1),$$ (65)

which Eve wishes to minimize. The faked weak measurement results will yield faked estimated expectation values given by:

$$\langle H^+ \rangle_a^{fake} = \frac{1}{2} + \alpha\left[p_H\left(\langle H^+ \rangle_a - \frac{1}{2}\right) + (1-p_H)\left(\langle H^- \rangle_a - \frac{1}{2}\right)\right],$$ (66)

and $$\langle H^- \rangle_a^{fake} = \frac{1}{2} + \alpha\left[p_H\left(\langle H^- \rangle_a - \frac{1}{2}\right) + (1-p_H)\left(\langle H^+ \rangle_a - \frac{1}{2}\right)\right],$$ (67)

where $$\langle H^{\pm} \rangle_a$$

are from the results of Eve's weak measurements and given in eqns. (54) and (55).

From this, Alice and Bob's r parameter estimates are now:

$$\tilde{r}_s^+ = +\alpha(2p_H - 1),$$ (68)

$$\tilde{r}_x^- = +\alpha(2p_H - 1),$$ (69)

$$\tilde{r}_z^0 = +\alpha,$$ (70)

and $$\tilde{r}_z^1 = +\alpha.$$ (71)

Therefore the bit error rate estimated by Alice and Bob under this weak measurement attack will be:

$$\tilde{\delta}_b = \frac{1}{2}(1 - \alpha p_H). \tag{72}$$

This looks good for Eve as $\alpha$ is freely chosen by her. However, Alice and Bob will test the trustworthiness of the weak measurement device by estimating the variance of the weak measurement results. Recognizing that the weak measurements are independent of the source, the estimated variances conditioned on each source should be statistically equivalent. The variances of the fake measurement results conditioned on the source basis are given by:

$$\text{Var}[\Delta_{fp}(H^{\pm}, X)] = \text{Var}[\alpha\Delta_{\pm,x}^{Eve}] = \left[\alpha\frac{g_{Eve}\sigma_{Eve}}{(2p_H - 1)}\right]^2, \tag{73}$$

$$\text{Var}[\Delta_{jp}(H^{\pm}, X)] = \text{Var}[\alpha\Delta_{\pm z}^{Eve}] = (\alpha g_{Eve}\sigma_{Eve})^2. \tag{74}$$

The variance test performed by Alice and Bob then forces Eve to render eqns. (73) and (74) equal, which can only be satisfied when $p_H=1$. This is the degenerate case covered by Attack Strategy 1. The significance of this result is that if Eve has no information about the source basis, then in the asymptotic key regime only perfect information about the weak measurement observable permits her to utilize her control of the weak measurement device to compromise the security of the protocol.

Attack Strategy 2

$$\left(\frac{1}{2} < p_{basis} < 1, \frac{1}{2} < p_H < 1\right).$$

With the previous result, one might ask to what extent Eve can use any side-channel information about the source basis combined with imperfect information about the weak measurement observable to break the protocol. It turns out that such a strategy does exist, and the details of this attack and the derivation of the resulting lower bound on Alice and Bob's estimated QBER has been shown by Troupe (2017) Appendix A. This lower bound is given by:

$$\delta_b^L = \frac{1}{2}\left[1 - \left(\frac{\sigma_{sec}}{\sigma_{MD}}\right)p_{basis}p_H\right]. \tag{75}$$

Given an error security bound of $\sigma_{sec}$, the protocol is secure against this attack strategy whenever $$\delta_{sec} - \delta_{um} < \delta_b^L.$$

In other words, the ratio $\sigma_{sec}/\sigma_{MD}$ will impose an upper bound on the permitted value of the product $p_{basis} \cdot p_H$ such that the protocol's security is preserved when this attack is employed.

Attack Strategy 3 of $(p_{basis}>1-2\delta_{sec}, p_H>1)$. In this case, Eve's most powerful attack strategy is to simply perform an intercept-resend attack on the quantum channel, measuring in the Z basis whenever she believes the signal was prepared in Z, and leave Bob's true weak measurement results unaltered. Because $p_{basis}>1-2\delta_{sec}$, it follows that the noise introduced by guessing the incorrect basis will be below the error security bound. Obviously, this attack is one open to Eve against any QKD protocol that is not completely device independent. The following conjecture can be made:

Conjecture—In the limit of infinite key length and given that Assumptions 1 and 2 are valid, either Attack Strategy 2 or Attack Strategy 3 is optimal for all values of $p_{basis}$ and $p_H$. In other words, given the assumptions, there are no attack strategies that utilize source basis and weak measurement observable side-channel information that extract a greater amount of key information with an equivalent QBER as estimated by Alice and Bob.

The most likely method Eve would use to gain information about the weak measurement observable choice is via an active Trojan horse attack on Bob's weak measurement apparatus. These attacks would be implemented using essentially the same techniques as Trojan horse attacks on the source or measurement basis choices by Jain (2014) in other QKD protocols. Characterizing and limiting information leakage into such side channels is a requirement for any QKD protocol that is not fully device independent. In particular, we note that the MDI-QKD protocol is also vulnerable to Trojan horse attacks on either Alice or Bob's sources. In effect, MDI-QKD trades the vulnerability to detector attacks on Bob's detection basis choice in BB84 for vulnerability to Trojan horse attacks on Bob's source basis choice. The exemplary protocol utilizes a similar trade by swapping Bob's detector basis choice for his choice of which observable to weakly measure. A key point is that the exemplary protocol is able to perform this trade using only single photons and without any need for successful two-photon interference as in MDI-QKD. In addition, Eve needs a significantly larger amount of information about the choice of observable in WM-QKD to break the protocol than she needs about Bob's choice of source basis in MDI-QKD. The full protocol including the weak measurement certification step is available in Troupe (2017) Appendix B.

Figure 11:
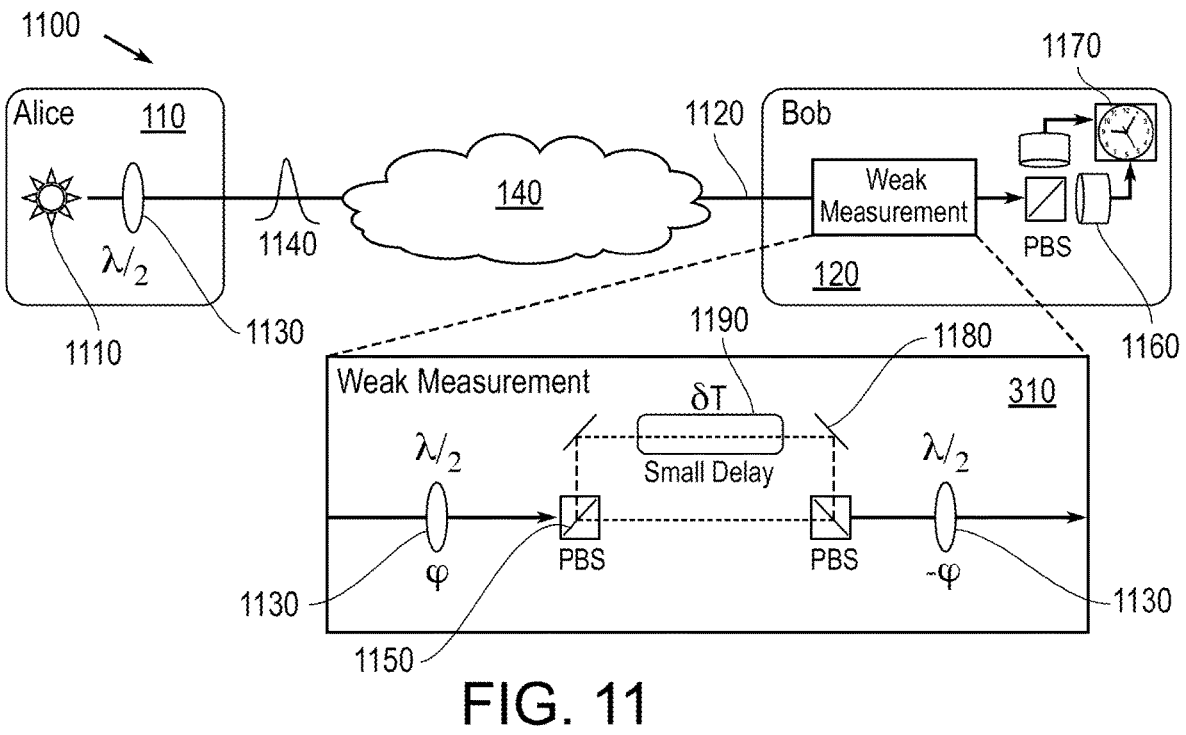
FIG. 11 is a diagram view of an exemplary communication protocol.

FIG. 11 shows a schematic view 1100 of a possible implementation of the weak measurement QKD protocol. Alice 110 includes a photon emitter 1110 to transmit a temporal signal 1120 focused by a lens 1130 yielding a temporal wavefunction 1140. The signal 1120 passes through a network cloud 140 to recipient Bob 120, who possesses a weak measurement detector 310 and along with a polarizing beam splitter (PBS) 1150 and photon detectors 1160 coupled to a clock 1170. The detector 310 includes a pair of lenses 1130 that flank an assembly pair of PBSs 1150 associated with reflective mirrors 1080 with a small delay 1190 between the mirrors 1180. Bob's lenses 1130 Key information is encoded using the polarization of the signal photons. The photons' time degree of freedom is used as the weak measurement pointer. The weak measurement coupling strength $\gamma$ is controlled by the size of the relative delay 1190 between the paths in the interferometer within the detector 310.

Section VIII Implementation: The feasibility of the protocol can be sketched with one particular implementation. Let one suppose that the raw key information is encoded in the polarization of the signal photons with Alice 110 randomly choosing to encoded in either the linear polarization basis (Z) or the diagonal basis (X). Furthermore, the weak measurement pointer state will be the temporal wavefunction 1140 of the signal pulses. The weak measurement pointer states are prepared so that the single photons are emitted with a temporal envelope as wavefunction 1140 that is Gaussian shaped with a fixed width $\tau$ and a peak value that occurs at a known time as determined by an accurate clock at the source 1010. Bob 120 possesses the clock 1170 that is synchronized with Alice's source clock. Bob 120 uses this clock 1170 to record the time each photon is detected by the single photon detectors 1160 that perform the final Z basis measurement. In the new protocol, Bob 120 must also weakly measure one of the projectors onto the two H polarization states (randomly chosen) given by:

$$|H^+\rangle = \cos\left(\pm\frac{\pi}{8}\right)|0\rangle - \sin\left(\pm\frac{\pi}{8}\right)|1\rangle, \qquad (76)$$

in which rotation is $$\varphi = \pm\frac{\pi}{8}.$$

To implement the necessary weak measurement interaction, Bob 120 uses a polarizing interferometer including two polarizing beam splitters 115 oriented with the linear basis and a polarization independent optical delay 1190 in one path of the interferometer with duration $\delta T \ll \tau$ as in view 1100. Because the optical delay 1190 is small compared with the photon's temporal uncertainty, the entanglement between the photon's polarization and path is very weak. Just before each photon enters the polarizing interferometer, Bob uniformly randomly chooses to measure one of the two projectors onto $\hat{H}^+$ 590 and $\hat{H}^+$ 580 by rotating the incoming photon's polarization state by $$\varphi = \frac{\pi}{8}$$

or $$\varphi = -\frac{\pi}{8}$$

respectively by his lenses 1130. On exiting the interferometer, the polarization of each photon then rotates back to its original state. By implementing the weak measurement interaction in this manner, the interaction strength is ensured to always be the same for both projectors as the same delay is used. The weak measurement pointer used here is the time degree of freedom for the photons' exiting of the source aperture. As long as the signal pulse's temporal wavefunction 1140 is well controlled and the detectors' timing jitter are relatively small compared to the weak measurement's optical delay 1190, accurate estimates of delay time, and thus the weak measurement results, can be obtained.

Finally, one can observe that this implementation is only one of many possibilities. For example, in the case that the raw key information is encoded into the phase of the signal pulses, the polarization degree of freedom could be used as the weak measurement pointer. Bob would then utilize weak coupling between the paths inside of the appropriate non-polarizing interferometer and the photons' polarization to implement a weak measurement of phase. Additionally, while one can chose to highlight using an additional degree of freedom of the photons themselves for the weak measurement pointer states, in principle these states could be the states of some other quantum systems prepared by Bob, who would weakly couple this system to each photon upon receipt and then strongly measure this system independently of the photons.

One potential method of using an external quantum system to perform the weak measurements involves performing a suitably weak non-demolition measurement of the photon number of the path through the interferometer defining the weak measurement observable. This could potentially be accomplished using a nonlinear optical interaction to shift the phase of a coherent state local oscillator used as the weak measurement pointer by Sinclair (2016) and Venkataraman (2012) in the presence of a signal photon in the interferometer path. A beneficial feature of the exemplary application of a nonlinear optical interaction based non-demolition measurement is that, in contrast to performing high quality quantum gates for quantum computing, one does not need or even desire a high degree of distinguishability between the occupation and non-occupation of the path. A benefit of the analysis of Section VII is that by implementing the weak measurements using additional degrees of freedom of the photons themselves, and thus granting Eve direct access to the pointer states, one does not necessarily compromise the security of the protocol.

Section IX Performance Comparisons of Predicted Asymptotic Secure Key Rate: A comparison can be shown for the asymptotic secure key rates of the new weak measurement protocol, a decoy state BB84 protocol, and the MDI protocol of Lo (2012) under various QKD system configurations. In view 800, one can compare the Decoy+Vacuum BB84 protocol, calculated using eqn. (48) in Ma (2005), and the Weak+Vacuum Weak Measurement protocol, calculated using eqn. (47), with two types of avalanche photon detector (APD): standard non-cryogenic indium-gallium-arsenic (InGaAs) APDs from Gobby (2004) and higher efficiency indium-phosphorus (InGaAs/InP) APDs by Comandar (2015). Also, Marsali (2013) describes cryogenic superconducting nanowire single-photon detectors with 93% detection efficiency. As expected, the use of such extremely high efficiency detectors significantly increases the performance of both protocols, as well as closes the gap somewhat between the two in the case of very low intrinsic system error. One can choose realistically weak interactions for the weak measurements with $g/\sigma_{MD}=0.05$, along with a conservative intrinsic system error rate of $e_d=0.015$, which can be modeled as a rotation of the state of the source qubit in the X, Z plane as defined by the weak measurement observables. The detection efficiency and dark count rate parameters were taken from the QKD experiment reported in Gobby (2004). The penalty paid in secure rate when using weak measurements for parameter estimation is barely perceptible. This shows that the weak measurement protocol has almost the same asymptotic secure key rate as BB84 itself, but without vulnerabilities to detector control by Eve.

Figure 12:
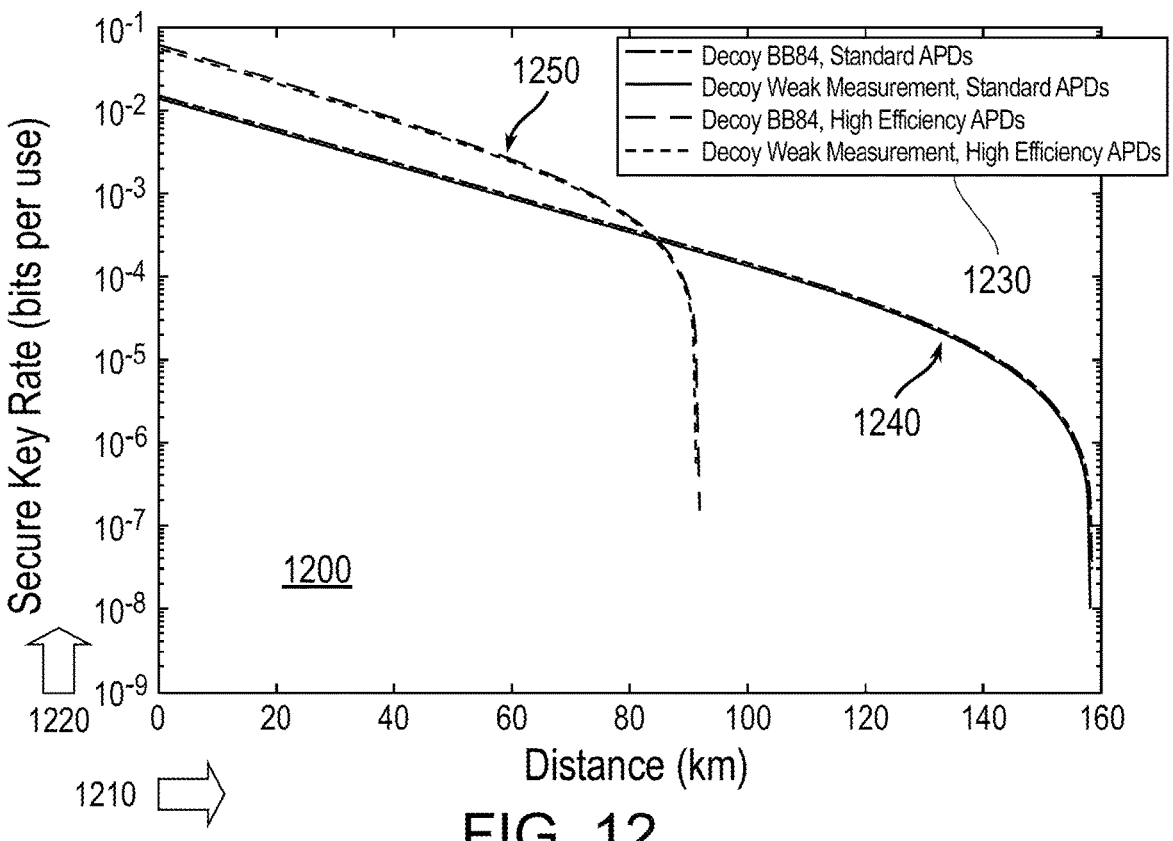
FIG. 12 is a graphical view of key rates variation with distance.

FIG. 12 shows a graphical view 1200 of a comparison of secure key rates as a plot of Weak Measurement (WM) and BB84 with protocols, both with Weak+Vacuum decoy states. Distance 1210 in kilometers denotes the abscissa, and secure key rate 1220 logarithmically in bits-per-use is the ordinate. A legend 1230 identifies solid curves 1240 with standard APDs and dash curves 1250 with high efficiency APDs. Solid curves 1240 overlay decoy BB84 and decoy WM beginning at rate about $1\times10^{-2}$ and collapsing at under 160 km distance. Dash curves 1250 overlay decoy B884 and decoy WM beginning at rate $5\times10^{-2}$ and collapsing at 90 km. The pulse intensities for each protocol are $\mu=0.48$, v=0.05, channel loss rate is 0.2 dB/km, and error reconciliation factor is f=1.22. Solid lines 1240 use measurement devices with total detection efficiency $\eta_d$=0.145 and vacuum count rate $Y_0$=6×10$^{-8}$. For dash lines 1250, $\eta_d$=0.55 and $Y_0$=5×10$^{-4}$. The weak measurement strength is σ/g=0.05. The system intrinsic error rate in both cases is 1.5%. Because WM-QKD is secure against all detector control attacks, it is instructive to compare its performance to MDI-QKD, currently the most feasible way to implement quantum cryptography without any detector vulnerabilities. In the limit of an infinite number of decoy states and assuming the only intrinsic system errors are due to rotations of the source qubits, the asymptotic secure key rate of MDI-QKD can be calculated as in Xu (2015).

Figures 13, 14:
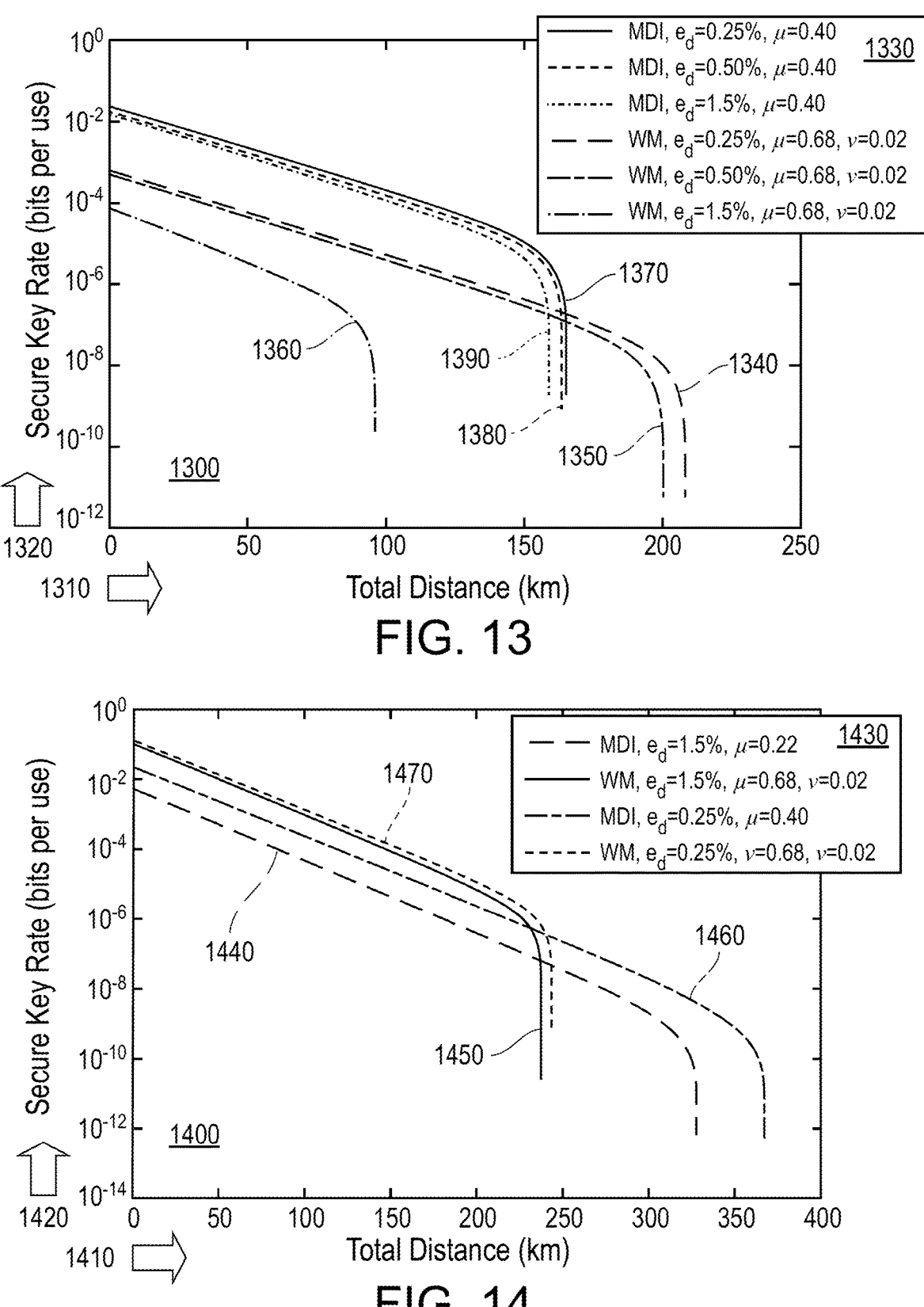
FIG. 13 is a graphical view of key rates variation with distance.
FIG. 14 is a graphical view of key rates variation with distance.

FIG. 13 shows a graphical view 1300 of secure key rate loss with distance communicated for standard APDs. Total distance 1310 in kilometers denotes the abscissa while secure key rate 1320 in bits-per-use denotes the ordinate. A legend 1330 identifies the MDI-QKD (for μ at 0.40) and WM-QKD (for μ at 0.68 and v at 0.02) curves, all showing linear logarithmic decrease with distance until reaching an asymptotic collapse. Solid MDI curve 1340 for $e_d$ at 0.25% begins at below 0.003 and collapses at about 210 km. Dash MDI curve 1350 for $e_d$ at 0.50% similarly collapses at 200 km. Dot MDI curve 1360 for $e_d$ at 1.5% begins at below 0.0001 and collapses prior to reaching 100 km. Solid WM curve 1370 for $e_d$ at 0.25% begins at above 0.01 and collapses at 160 km. Respective dash and dot WM curves 1380 for $e_d$ at 0.50% and 1390 for $e_d$ at 1.5% feature similar trends with much less degradation with increase in system error rate $e_d$ as compared to MDI curves. Using standard avalanche photon detectors (APDs), the view 1300 indicates that WM curve 1370 has a secure key rate that is typically two orders of magnitude higher than MDI curve 1340 and a positive secure rate for a distance that is about 75-90% that of MDI curve 1340.

FIG. 14 shows a graphical view 1400 of the stability of WM-QKD as compared to MDI-QKD under increases in the intrinsic system error rate. The cryogenic APDs have 93% detection efficiency, as per Marsili (2013) for this secure key rate loss with distance communicated for cryogenic superconducting nanowire single-photon detectors of the two protocols for very low and moderate intrinsic system errors of 0.25% and 1.5% respectively. Total distance 1410 in kilometers denotes the abscissa while secure key rate 1420 in bits-per-use denotes the ordinate. A legend 1430 identifies the MDI-QKD (for μ at 0.22 and 0.40) and WM-QKD (for μ at 0.68 and v at 0.02) curves, all showing linearly logarithmic decrease with distance from about 0.008 to 0.1 rates until reaching an asymptotic collapse. In particular, MDI moderate error curve 1440 collapses at 330 km, WM moderate error curve 1450 collapses at 240 km, MDI low error curve 1460 collapses at 370 km, while WM low error curve 1470 collapses at 250 km. The total detection efficiency is 14.5%, the channel loss rate is 0.2 dB/km, and the error reconciliation factor is f=1.16.

An important issue for the performance of a practical QKD system is the stability of the secure key rate with respect to changes in the system parameters. Due to the complex relationship between these parameters in MDI-QKD, there can be a significant variability in the achievable secure key rate with small changes in source intensity or system error rate. For example, view 1300 compares how changes in the intrinsic system error rate affect the secure key rate for MDI-QKD and WM-QKD. The signal/decoy intensities for each protocol were optimized for a system intrinsic error rate of 0.25% and held fixed. As the system's error rate rises above 1%, MDI-QKD's performance degrades very rapidly shown by curves 1350 and 1360. In comparison, the performance of WM-QKD is quite stable as a function of the intrinsic system error, shown by curves 1370, 1380 and 1390. This is due to the relative simplicity of performing single qubit measurements compared to the Bell state measurements of MDI-QKD. As expected, such extremely high efficiency detectors significantly increase the performance of both protocols, and also closes the gap somewhat between the two in the case of very low intrinsic system error. In all of these cases, one has attempted to optimize the choice of signal and/or decoy intensities to maximize the key rates for each protocol and each set of system parameters.

Section X Conclusion: This disclosure has presented an exemplary prepare-and-measure QKD protocol that utilizes weak measurements to decouple security parameter estimation from the photon detection basis. This protocol provides a much simpler solution to well-known detector control attacks than alternatives such as MDI-QKD. The disclosure demonstrates the robustness of the protocol against weak measurement implementation imperfections. Additionally, the extreme scenario has been analyzed in which Eve can completely control the weak measurement results themselves, and conjectured optimal attack strategies in this regime. These attack strategies are demonstrated to necessarily fail when there is a small limitation on Eve's ability to accurately guess Bob's choice of weak measurement observable and Eve cannot alter the photon's state after the weak measurement interaction.

Finally, the disclosure compares the asymptotically achievable secure key rates of the new weak measurement protocol to BB84 with Weak+Vacuum decoy states and MDI-QKD with an infinite number of decoy states. One has found that the weak measurement protocol should have almost identical performance to the BB84 protocol and is up to two orders of magnitude better than MDI-QKD for realistic system parameters and using standard, non-cryogenic detectors. While MDI-QKD protocols eliminate detectors from the analysis of security, implementation of these protocols are highly non-trivial, costly, and have a reduced overall key throughput as compared to prepare-and-measure protocols. The prepare-and-measure weak measurement QKD protocol introduced in this article offers a cost-effective alternative to MDI-QKD that, while also eliminating detector control based attacks, will achieve an overall secure key throughput essentially equivalent to the original BB84 protocol. Although the exemplary weak measurement QKD protocol is not fully detection device independent because it is in principle susceptible to some detector side-channels, e.g., timing attacks in Lamas-Linares (2007), that can leak key information independent of channel parameter estimation, WM-QKD is immune to detector control, e.g., detector blinding attacks.

The analysis presented in this disclosure confirms the asymptotic security of a weak measurement QKD protocol:
(1) in the ideal case,
(2) with reasonable device imperfections, and
(3) against a general class of attacks in which Eve has complete control over the outcomes of the weak measurements.

Future work will address the security of the weak measurement QKD protocol in the finite key length regime. In addition, continued efforts are expected to develop detailed descriptions of realistic implementations of the protocol and derive the resulting predicted secure key rates.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A quantum key distribution (QKD) receiver for communicating with a transmitter that produces a plurality of entangled photon qubit pairs to send one qubit from each pair randomly alternating between basis states, said receiver comprising:

a first polarized beam splitter for receiving the one qubit for passage or reflection; an orthogonal pair of photon detectors for measuring the one qubit from said passage or said reflection; an apparatus for performing a weak measurement on the one qubit, including an impedance device to induce time delay, a pair of mirrors flanking said impedance device, second and third polarized beam splitters for alternatively passing the one qubit to each other and to said pair of mirrors, and a pair of lenses flanking said second and third splitters to rotate the one qubit;

a broadcaster for sending weak measurement results from said detectors to the transmitter; an error rate estimator to determine whether said weak measurement satisfies a bit error threshold: and a post-processor to correct said weak measurement from one of the basis states in response to a shared random key from the transmitter.

2. The QKD receiver according to claim 1, further including a clock in said apparatus for determining time degree of freedom of the one qubit.

3. The QKD receiver according to claim 1, wherein said rotate the one qubit by $\pm\pi/8$.

4. A communication method for quantum key distribution (QKD) with a transmitter that produces a plurality of entangled photon qubit pairs to send one qubit from each pair randomly alternating between basis states, said method comprising:

polarized splitting of the one qubit for passage or reflection via a first polarized beam splitter;

detection measuring the one qubit from said passage or said reflection;

performing a weak measurement on the one qubit, including inducing time delay, alternatively passing the one qubit between second and third beam splitters and a pair of mirrors, and rotating the one cubit via a pair of lenses flanking said second and third splitters;

sending weak measurement results to the transmitter;

determining whether said weak measurement satisfies a bit error threshold; and correcting said weak measurement from one of the basis states in response to a shared random key from the transmitter.

* * * * *